(12) United States Patent
Rahman et al.

(10) Patent No.: US 11,356,881 B2
(45) Date of Patent: Jun. 7, 2022

(54) METHOD AND APPARATUS FOR APERIODIC REFERENCE SIGNAL TRANSMISSION AND RECEPTION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 16/897,182

(22) Filed: Jun. 9, 2020

(65) Prior Publication Data
US 2020/0404525 A1   Dec. 24, 2020

Related U.S. Application Data

(60) Provisional application No. 62/932,702, filed on Nov. 8, 2019, provisional application No. 62/913,362, filed on
(Continued)

(51) Int. Cl.
*H04W 4/00* (2018.01)
*H04W 24/10* (2009.01)
*H04L 5/00* (2006.01)

(52) U.S. Cl.
CPC ........... *H04W 24/10* (2013.01); *H04L 5/0023* (2013.01); *H04L 5/0057* (2013.01)

(58) Field of Classification Search
CPC ..... H04W 24/10; H04L 5/0023; H04L 5/0057
(Continued)

(56) References Cited

U.S. PATENT DOCUMENTS

2018/0368142 A1   12/2018   Liou
2019/0132109 A1*   5/2019   Zhou ..................... H04L 5/001
(Continued)

FOREIGN PATENT DOCUMENTS

| CA | 3053235 A1 | 8/2018 |
| WO | 2018147676 A1 | 8/2018 |
| WO | 2019099659 A1 | 5/2019 |

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 238 pages.
(Continued)

*Primary Examiner* — Thai D Hoang

(57) ABSTRACT

A method for operating a user equipment (UE) for aperiodic channel state information reference signal (CSI-RS) reception comprises receiving aperiodic CSI-RS configuration information including a CSI-RS triggering offset; receiving downlink control information (DCI) via a physical downlink control channel (PDCCH), where the DCI triggers an aperiodic CSI-RS; and determining the CSI-RS triggering offset based on the CSI-RS configuration information, wherein the CSI-RS triggering offset is configured from a first set when $\mu_{PDCCH} < \mu_{CSIRS}$, and the CSI-RS triggering offset is configured from a second set when $\mu_{PDCCH} \geq \mu_{CSIRS}$, wherein $\mu_{PDCCH}$ and $\mu_{CSIRS}$ are subcarrier spacing configurations for the PDCCH and the aperiodic CSI-RS, respectively, and receiving the aperiodic CSI-RS in a slot $K_s$ determined based on the CSI-RS triggering offset, a slot containing the triggering DCI, and the subcarrier spacing configurations ($\mu_{PDCCH}$ and $\mu_{CSIRS}$).

20 Claims, 14 Drawing Sheets

Related U.S. Application Data on Oct. 10, 2019, provisional application No. 62/910,832, filed on Oct. 4, 2019, provisional application No. 62/873,604, filed on Jul. 12, 2019, provisional application No. 62/863,975, filed on Jun. 20, 2019.

(58) Field of Classification Search
USPC .................................. 370/329–330, 335–345
See application file for complete search history.

(56) References Cited

U.S. PATENT DOCUMENTS

| | | | | |
|---|---|---|---|---|
| 2019/0132110 | A1* | 5/2019 | Zhou | H04L 5/0094 |
| 2019/0260447 | A1* | 8/2019 | Nam | H04W 72/042 |
| 2019/0261425 | A1* | 8/2019 | Park | H04L 1/0026 |
| 2020/0036424 | A1 | 1/2020 | Kang et al. | |
| 2020/0288479 | A1 | 9/2020 | Xi et al. | |
| 2020/0322957 | A1* | 10/2020 | Tomeba | H04W 72/0453 |
| 2021/0045076 | A1* | 2/2021 | Tomeba | H04B 7/0617 |
| 2021/0091902 | A1* | 3/2021 | Yamada | H04L 5/0048 |
| 2021/0195608 | A1* | 6/2021 | Wu | H04B 17/309 |
| 2021/0282143 | A1* | 9/2021 | Lee | H04W 52/281 |
| 2021/0298079 | A1* | 9/2021 | Tomeba | H04W 72/1289 |

OTHER PUBLICATIONS

"3rd Generation Partnership Project; Technical Specification Group Radio Access Network; Evolved Universal Terrestrial Radio Access (E-UTRA); Multiplexing and channel coding (Release 15)", 3GPP TS 36.212 V15.5.0, Mar. 2019, 246 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.5.0, Mar. 2019, 552 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.5.0, Mar. 2019, 131 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.0, Mar. 2019, 944 pages.
"3rd Generation Partnership Project; Technical Specification Group Radio Access Network; NR; Physical channels and modulation (Release 15)", 3GPP TS 38.211 V15.5.0, Mar. 2019, 96 pages.
"3rd Generation Partnership Project; Technical Specification Group Radio Access Network; NR; Multiplexing and channel coding (Release 15)", 3GPP TS 38.212 V15.5.0, Mar. 2019, 101 pages.
"3rd Generation Partnership Project; Technical Specification Group Radio Access Network; NR; Physical layer procedures for control (Release 15)", 3GPP TS 38.213 V15.5.0, Mar. 2019, 104 pages.
"3rd Generation Partnership Project; Technical Specification Group Radio Access Network; NR; Physical layer procedures for data (Release 15)", 3GPP TS 38.214 V15.5.0, Mar. 2019, 103 pages.
"3rd Generation Partnership Project; Technical Specification Group Radio Access Network; NR; Physical layer measurements, (Release 15)", 3GPP TS 38.215 V15.5.0, Jun. 2019, 16 pages.
"5G; NR; Medium Access Control (MAC) protocol specification (3GPP TS 38.321 version 15.5.0 Release 15)", ETSI TS 138 321 V15.5.0, May 2019, 80 pages.
"5G; NR; Radio Resource Control (RRC); Protocol specification (3GPP TS 38.331 version 15.5.1 Release 15)", ETSI TS 138 331 V15.5.1, May 2019, 488 pages.
"5G; NR; User Equipment (UE); radio access capabilities (3GPP TS 38.306 version 15.5.0 Release 15)", ETSI TS 138 306 V15.5.0, May 2019, 51 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
Ericsson, "Motivation for correction to aperiodic CSI-RS triggering with different numerology between PDCCH and CSI-RS", 3GPP TSG RAN1 Meeting #96, R1-1902121, Feb. 2019, 10 pages.
International Search Report of the International Searching Authority in connection with International Patent Application No. PCT/KR2020/008071 dated Sep. 25, 2020, 3 pages.
Ericsson, "Correction to aperiodic CSI-RS triggering with different numerology between PDCCH and CSI-RS," R1-1902120, 3GPP TSG RAN WG1 Meeting #96, Athens, Greece, Feb. 25-Mar. 1, 2019, 3 pages.
Catt, "Power saving scheme with cross-slot scheduling operation," R1-1905369, 3GPP TSG RAN WG1 Meeting #96bis, Xi'an, China, Apr. 8-12, 2019, 4 pages.
Extended European Search Report dated Feb. 11, 2022 regarding Application No. 20826390.5, 15 pages.
ZTE, "Summary of Maintenance for CSI Measurement", 3GPP TSG RAN WG1 Meeting #96, R1-1903425, Feb. 2019, 5 pages.

* cited by examiner

METHOD AND APPARATUS FOR APERIODIC REFERENCE SIGNAL TRANSMISSION AND RECEPTION

CROSS-REFERENCE TO RELATED APPLICATIONS AND CLAIM OF PRIORITY

The present application claims priority to U.S. Provisional Patent Application No. 62/863,975 filed on Jun. 20, 2019, U.S. Provisional Patent Application No. 62/873,604 filed on Jul. 12, 2019, U.S. Provisional Patent Application No. 62/910,832, filed on Oct. 4, 2019, U.S. Provisional Patent Application No. 62/913,362, filed on Oct. 10, 2019, and U.S. Provisional Patent Application No. 62/932,702, filed on Nov. 8, 2019. The content of the above-identified patent documents is incorporated herein by reference.

TECHNICAL FIELD

The present disclosure relates generally to wireless communication systems and more specifically to aperiodic reference signal reception and transmission in a wireless communication system.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable aperiodic reference signal reception/transmission in a wireless communication system.

In one embodiment, a UE for aperiodic channel state information reference signal (CSI-RS) reception is provided. The UE comprises a transceiver configured to receive aperiodic CSI-RS configuration information including a CSI-RS triggering offset, and receive downlink control information (DCI) via a physical downlink control channel (PDCCH), where the DCI triggers an aperiodic CSI-RS. The UE further includes a processor operably connected to the transceiver. The processor is configured to determine the CSI-RS triggering offset based on the CSI-RS configuration information, wherein: the CSI-RS triggering offset is configured from a first set when $\mu_{PDCCH} < \mu_{CSIRS}$, and the CSI-RS triggering offset is configured from a second set when $\mu_{PDCCH} > \mu_{CSIRS}$, wherein $\mu_{PDCCH}$ and CSIRS are subcarrier spacing configurations for the PDCCH and the aperiodic CSI-RS, respectively, and wherein the transceiver is further configured to receive the aperiodic CSI-RS in a slot $K_s$ determined based on the CSI-RS triggering offset, a slot containing the triggering DCI, and the subcarrier spacing configurations ($\mu_{PDCCH}$ and $\mu_{CSIRS}$S).

In another embodiment, a BS in a wireless communication system is provided. The BS includes a processor configured to generate an aperiodic channel state information reference signal (CSI-RS) configuration information and a downlink control information (DCI). The BS further includes a transceiver operably coupled to the processor. The transceiver is configured to: transmit the aperiodic CSI-RS configuration information including a CSI-RS triggering offset; transmit the DCI via a physical downlink control channel (PDCCH), where the DCI triggers an aperiodic CSI-RS; and transmit the aperiodic CSI-RS in a slot $K_s$, wherein the CSI-RS triggering offset is configured from a first set when $\mu_{PDCCH} < \mu_{CSIRS}$, and from a second set when $\mu_{PDCCH} > \mu_{CSIRS}$, where $\mu_{PDCCH}$ and $\mu_{CSIRS}$ are subcarrier spacing configurations for the PDCCH and the aperiodic CSI-RS, respectively, and wherein the slot $K_s$ is determined based on the CSI-RS triggering offset, a slot containing the triggering DCI, and the subcarrier spacing configurations ($\mu_{PDCCH}$ and $\mu_{CSIRS}$).

In yet another embodiment, a method for operating a UE for aperiodic channel state information reference signal (CSI-RS) reception is provided. The method comprises: receiving aperiodic CSI-RS configuration information including a CSI-RS triggering offset; receiving downlink control information (DCI) via a physical downlink control channel (PDCCH), where the DCI triggers an aperiodic CSI-RS; and determining the CSI-RS triggering offset based on the CSI-RS configuration information, wherein: the CSI-RS triggering offset is configured from a first set when $\mu_{PDCCH} < \mu_{CSIRS}$, and the CSI-RS triggering offset is configured from a second set when $\mu_{PDCCH} > \mu_{CSIRS}$, wherein $\mu_{PDCCH}$ and $\mu_{CSIRS}$ are subcarrier spacing configurations for the PDCCH and the aperiodic CSI-RS, respectively, and receiving the aperiodic CSI-RS in a slot $K_s$ determined based on the CSI-RS triggering offset, a slot containing the triggering DCI, and the subcarrier spacing configurations ($\mu_{PDCCH}$ and $\mu_{CSIRS}$).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
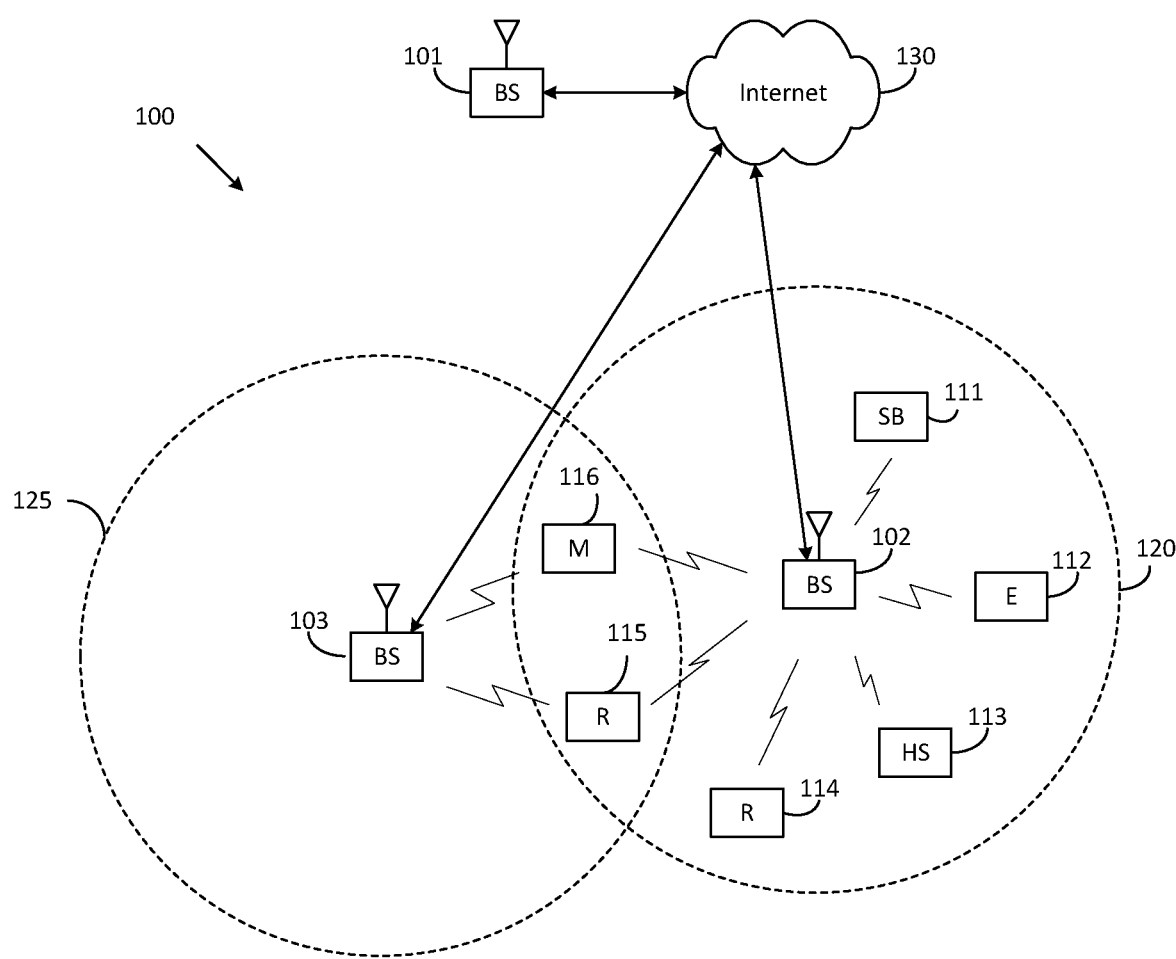
FIG. 1 illustrates an example wireless network according to embodiments of the present disclosure.

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.1.0, "E-UTRA, Physical channels and modulation;" 3GPP TS 36.212 v16.1.0, "E-UTRA, Multiplexing and Channel coding;" 3GPP TS 36.213 v16.1.0, "E-UTRA, Physical Layer Procedures;" 3GPP TS 36.321 v16.1.0, "E-UTRA, Medium Access Control (MAC) protocol specification;" 3GPP TS 36.331 v16.1.0, "E-UTRA, Radio Resource Control (RRC) protocol specification;" 3GPP TR 22.891 v14.2.0; 3GPP TS 38.211 v16.1.0, "E-UTRA, NR, Physical channels and modulation;" 3GPP TS 38.213 v16.1.0, "E-UTRA, NR, Physical Layer Procedures for control;" 3GPP TS 38.214 v16.1.0, "E-UTRA, NR, Physical layer procedures for data;" and 3GPP TS 38.212 v16.1.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
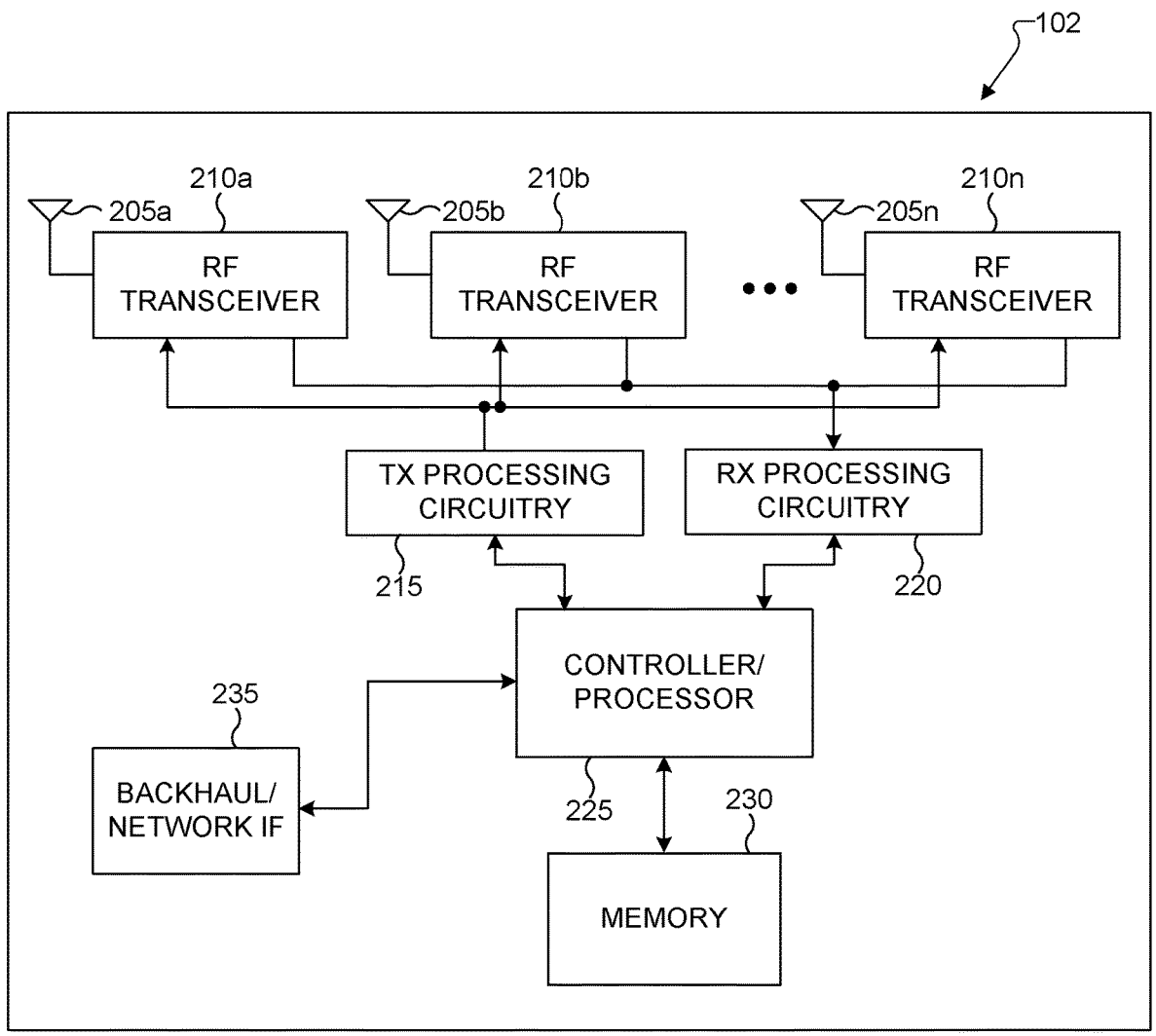
FIG. 2 illustrates an example gNB according to embodiments of the present disclosure.
Figure 3:
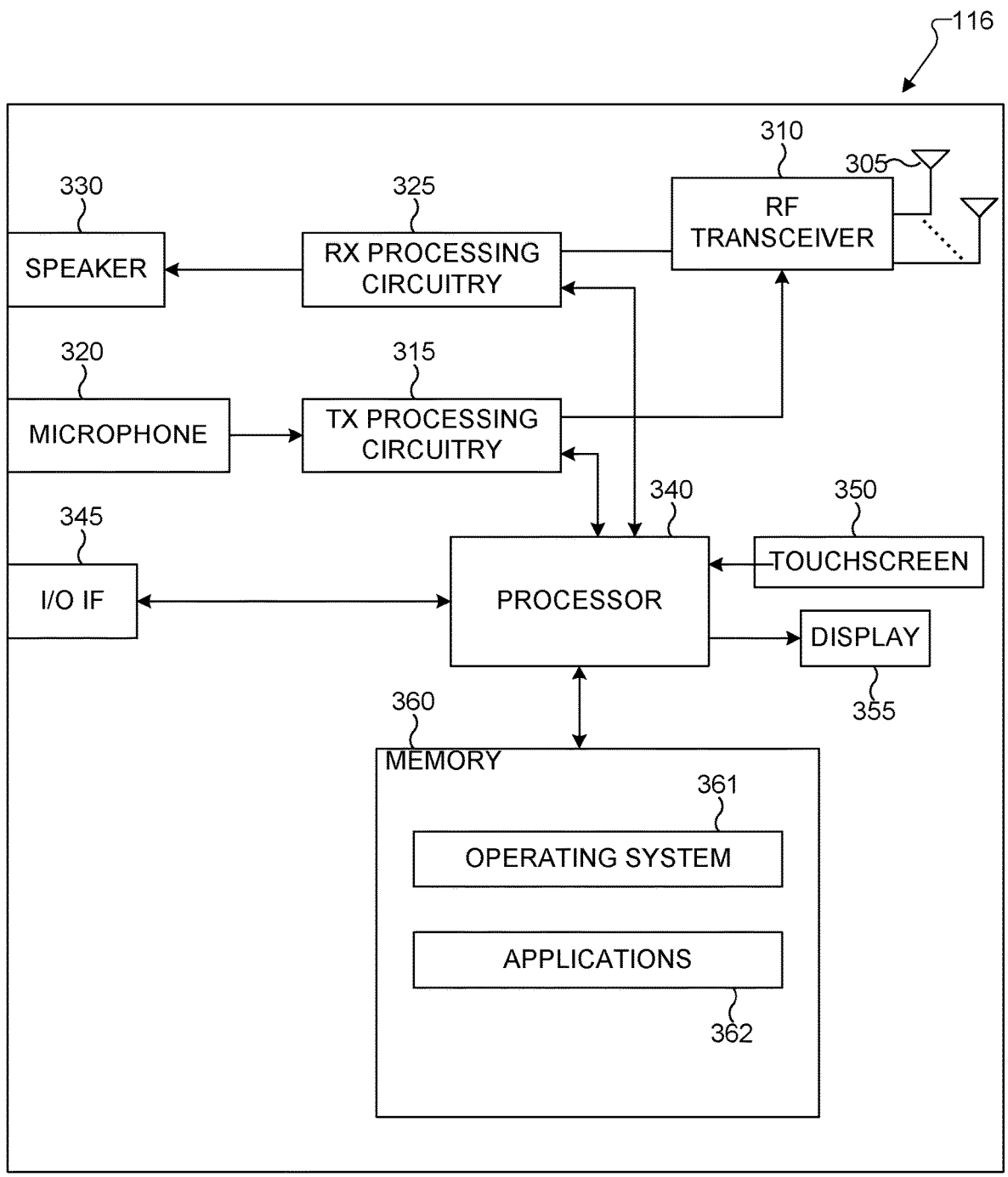
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for receiving aperiodic CSI-RS to determine and report CSI for communications in a wireless communication system. In certain embodiments, and one or more of the gNBs 101-103 includes circuitry, programming, or a combination thereof, for transmitting aperiodic CSI-RS to acquire CSI in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI-RS measurement and for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
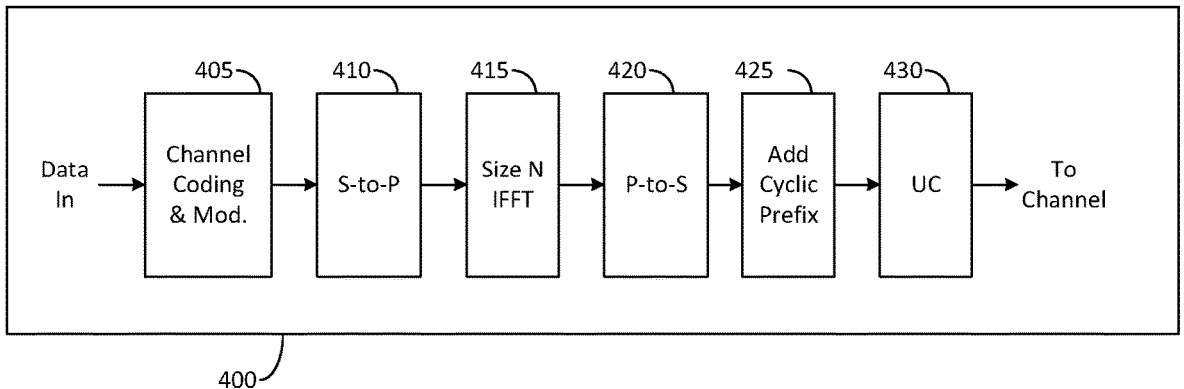
FIG. 4A illustrates a high-level diagram of an orthogonal frequency division multiple access transmit path according to embodiments of the present disclosure.
Figure 4B:
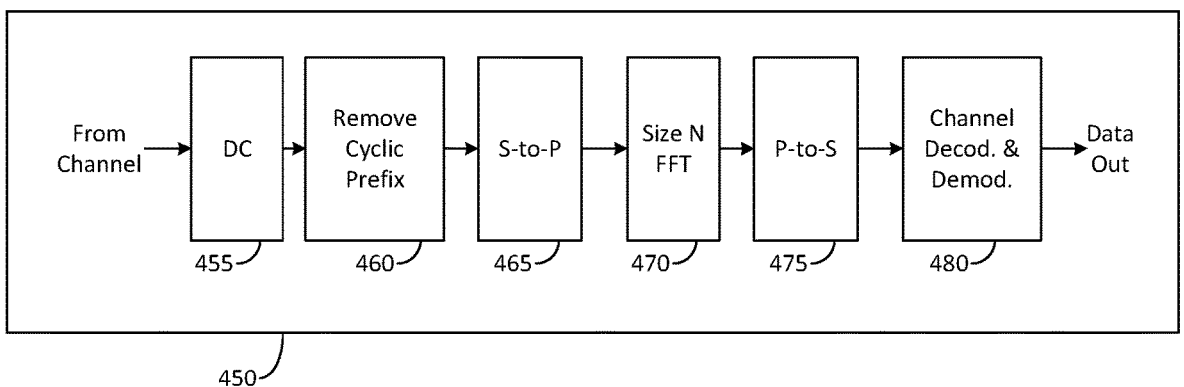
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

The 5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBS for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL} b-1)-N_{SRS}$, where $N_{SRS}=1$ if a last subframe symbol is used to transmit SRS and $N_{SRS}=0$ otherwise.

Figure 5:
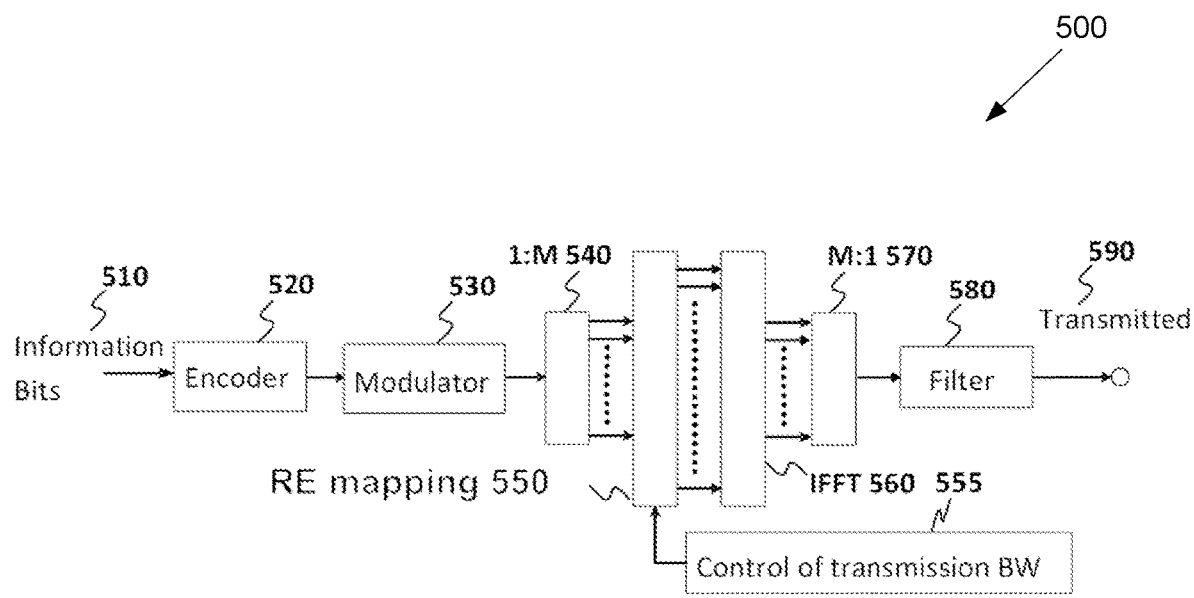
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
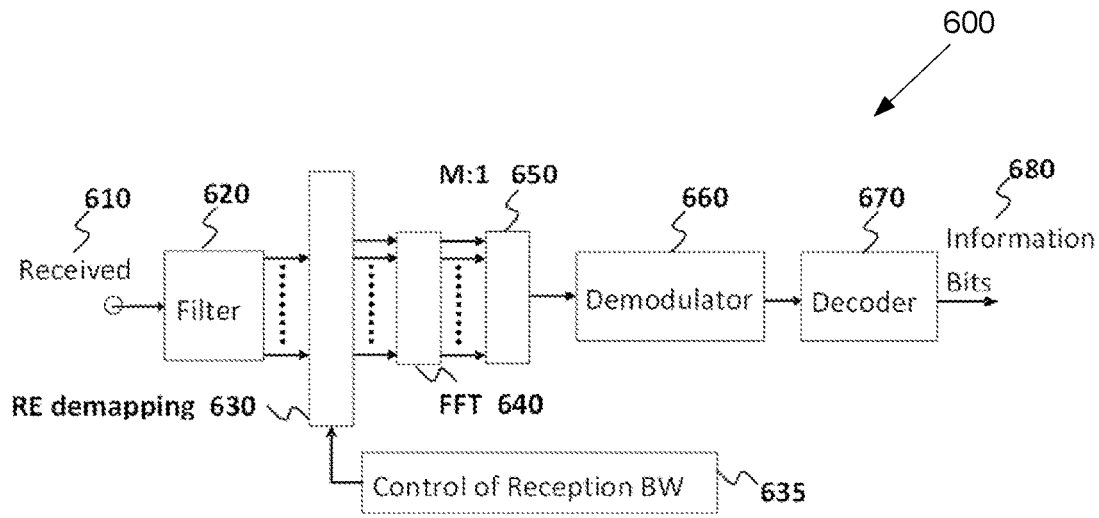
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
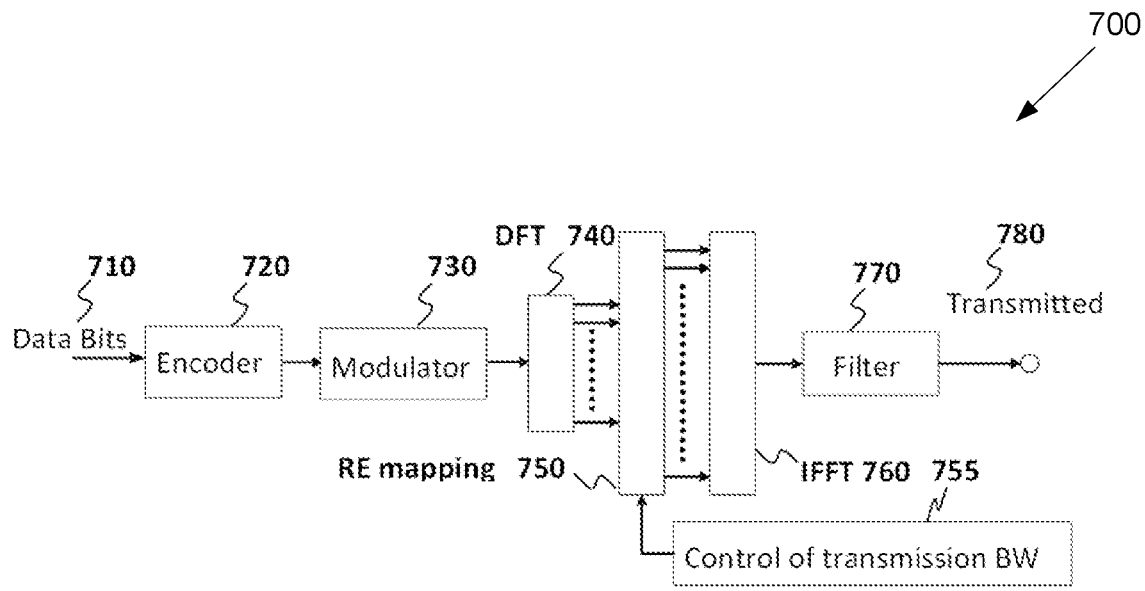
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
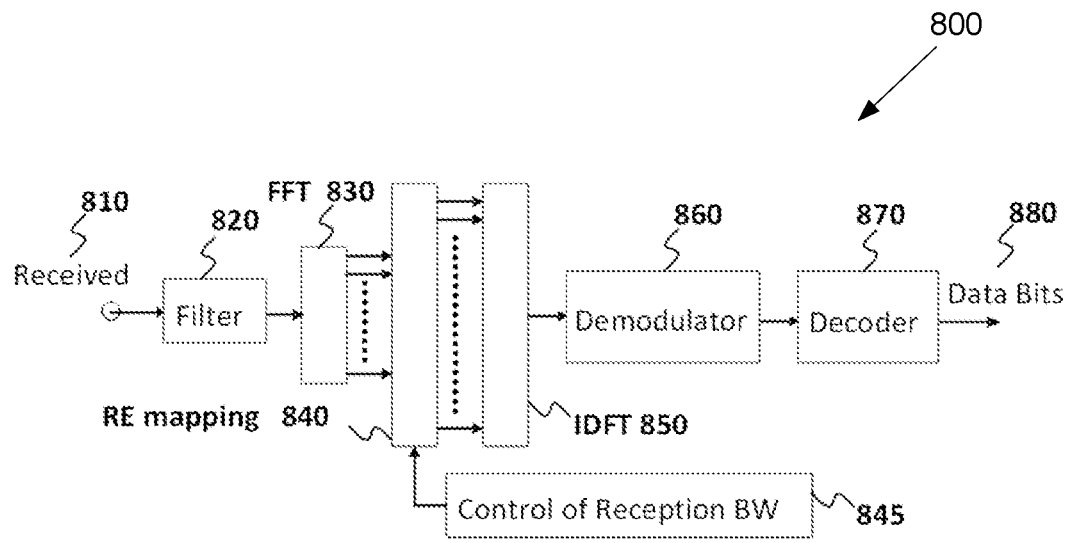
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
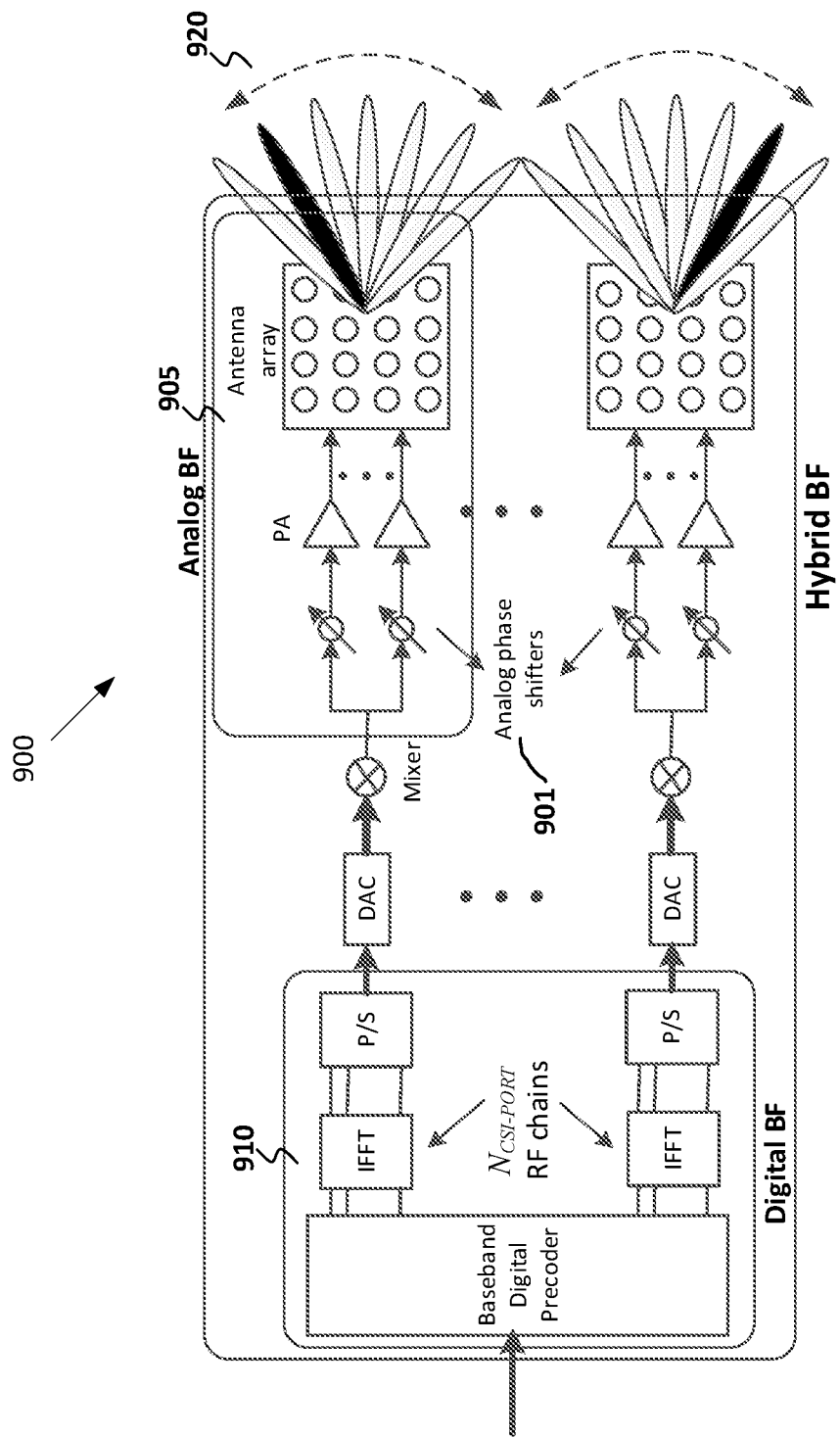
FIG. 9 illustrates an example antenna blocks according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

The 3GPP LTE and NR specifications support up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles 920 by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

The UL SU-MIMO transmission is supported using a codebook-based transmission scheme. In LTE UL codebook, pre-coders with antenna selection has been supported in order to keep peak-to-average power ratio (PAPR) low and cubic-metric (CM) for rank>1 small. Antenna selection offers performance improvement in some scenarios, especially for SC-FDMA based UL in LTE.

In 5G NR systems, two UL transmission schemes are supported, namely codebook-based and non-codebook-based. The codebook-based transmission scheme is based on an UL codebook similar to LTE. The NR UL codebook, however, is dependent on whether or not the UE is capable to transmit UL data (PUSCH) using all of, or a subset of antenna ports. For example, the UE can be capable of at least one of full-coherent (all antenna ports), partial-coherent (a subset of antenna ports), or non-coherent UL transmission (a single antenna port) to transmit a layer in UL. The 5G NR UL codebook has been designed keeping this UE coherence capability in mind.

In both LTE and NR, an UL grant (containing DCI format 4 for LTE and DCI format 0_1 for NR) includes a single TPMI field (along with TRI) which indicates the single precoding vector or matrix (from the UL codebook) a UE shall use for the scheduled UL transmission. Therefore, when multiple PRBs are allocated to the UE, a single precoding matrix indicated by the PMI implies that wideband UL precoding is utilized. Despite its simplicity, this is clearly sub-optimal since typical UL channel is frequency-selective and a UE is frequency scheduled to transmit using multiple PRBs. Yet another drawback of UL SU-MIMO is the lack of support for scenarios where accurate UL-CSI is unavailable at the eNB or gNB (which is important for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO should offer competitive performance even when accurate UL-CSI is unavailable at the eNB. Third, the proposed UL MIMO solution should be able to exploit UL-DL reciprocity where CSI-RS is utilized by the UE to provide UL-CSI estimation for TDD and FDD (with partial UL-DL reciprocity) scenarios. As described in U.S. patent application Ser. No. 15/491,927, filed Apr. 19, 2017 and entitled "Method and Apparatus for Enabling Uplink MIM," which is incorporated herein by reference in its entirety, such efficient UL MIMO operations and components have been proposed.

Similar to LTE, MIMO has been identified as an essential feature for 5G NR in order to achieve high system throughput requirements. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission (from a UE) relying on the channel reciprocity. For FDD systems, on the other hand, it can be acquired using the CSI-RS transmission from eNB, and CSI-RS measurement and CSI feedback from UE. In NR, two CSI reporting mechanisms are supported, Type I for low resolution CSI reporting and Type II for high resolution CSI reporting. In this disclosure, the term "measurement RS" is used to denote SRS or CSI-RS used for CSI measurement/reporting. The measurement RS (SRS or CSI-RS) can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

Figure 10:
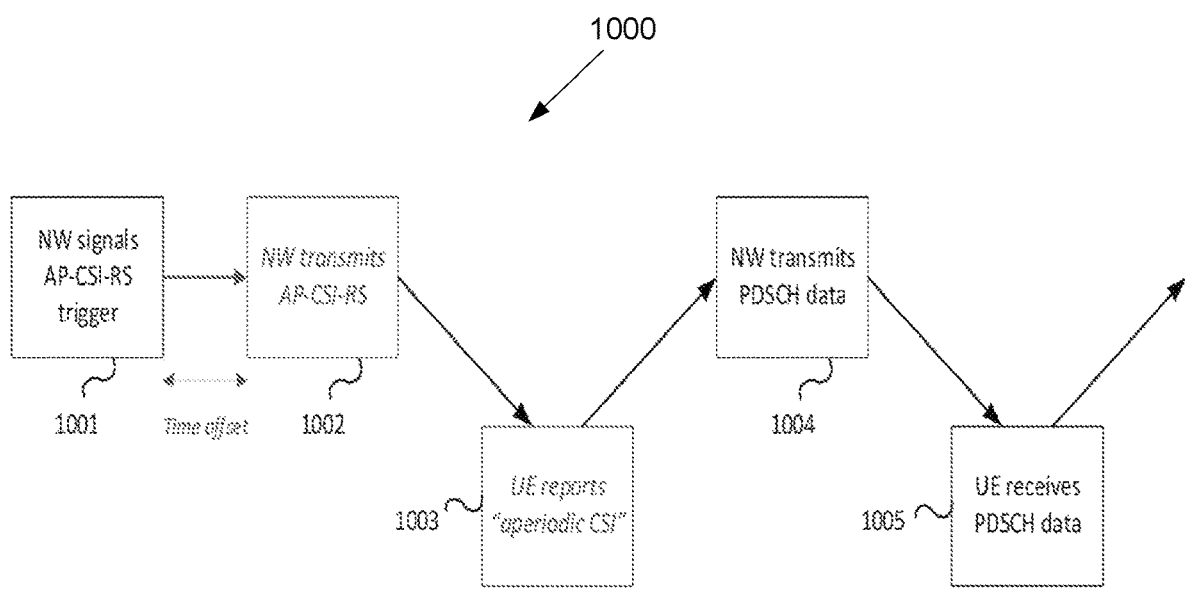
FIG. 10 illustrates an aperiodic CSI-RS measurement and aperiodic CSI reporting operation according to embodiments of the present disclosure.

FIG. 10 illustrates an aperiodic CSI-RS measurement and aperiodic CSI reporting operation 1000 according to embodiments of the present disclosure. The embodiment of the aperiodic CSI-RS measurement and aperiodic CSI reporting operation 1000 illustrated in FIG. 10 is for illustration only. FIG. 10 does not limit the scope of this disclosure to any particular implementation of the aperiodic CSI-RS measurement and aperiodic CSI reporting operation 1000.

When measurement RS is CSI-RS, an aperiodic CSI-RS transmission linked with an aperiodic CSI reporting is triggered via the CSI request field in DCI carried on PDCCH. In one example illustrated in FIG. 10, an aperiodic CSI-RS measurement and aperiodic CSI reporting operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports an aperiodic CSI (step 1003) comprising, for example, all or a subset of RI, CQI, PMI, LI, and CRI. Upon receiving the CSI report from the UE, the NW can use the CSI report for data (PDSCH) transmission (step 1004), and the UE can receive the data (PDSCH) transmission (step 1005).

Let $\mu_{CSIRS}$ and $\mu_{PDCCH}$ be the subcarrier spacing (SCS) configurations for CSI-RS and PDCCH, respectively. In one example, $\mu_{CSIRS}$ and $\mu_{PDCCH}$ take a value from $\{0, 1, 2, 3, 4\}$ which correspond to (or indicate) subcarrier spacing values $\{15\ \text{kHz}, 30\ \text{kHz}, 60\ \text{kHz}, 120\ \text{kHz}\}$.

For subcarrier spacing configuration μ, slots are numbered $n_s^\mu \in \{0, \ldots, N_{slot}^{subframe,\mu} - 1\}$ in increasing order within a subframe and $n_{s,f}^\mu \in \{0, \ldots, N_{slot}^{frame,\mu} - 1\}$ in increasing order within a frame. There are $N_{symb}^{slot}$ consecutive OFDM symbols in a slot where $N_{symb}^{slot}$ depends on the cyclic prefix as given by Table 1 and Table 2. The start of slot $n_s^\mu$ in a subframe is aligned in time with the start of OFDM symbol $n_s^\mu N_{symb}^{slot}$ in the same subframe.

TABLE 1

Number of OFDM symbols per slot, slots per frame, and slots per subframe for normal cyclic prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2

Number of OFDM symbols per slot, slots per frame, and slots per subframe for extended cyclic prefix.

| μ | $N_{symb}^{slot}$ | $N_{slot}^{frame,\mu}$ | $N_{slot}^{subframe,\mu}$ |
|---|---|---|---|
| 2 | 12 | 40 | 4 |

When $\mu_{CSIRS} = \mu_{PDCCH}$, the numerologies of PDCCH and CSI-RS are the same, hence the time offset for AP-CSI-RS transmission, as shown in FIG. 10, is the same in two numerologies. When $\mu_{CSIRS} \neq \mu_{PDCCH}$, however, the numerologies of PDCCH and CSI-RS are different, hence the time offset for AP-CSI-RS transmission, as shown in FIG. 10, can only be in one of the two numerologies. It is unclear which of the two numerologies is used for the time offset, and what are the additional steps required to determine in this case of mixed numerologies. This disclosure proposes example embodiments to address these questions.

In one embodiment 1, for each aperiodic CSI-RS resource in a CSI-RS resource set associated with each CSI triggering state, the UE is indicated the quasi co-location (QCL) configuration of quasi co-location RS source(s) and quasi co-location type(s), as described in NR, through higher layer signaling of qcl-info which contains a list of references to TCI-State's for the aperiodic CSI-RS resources associated with the CSI triggering state. If a State referred to in the list is configured with a reference to an RS associated with 'QCL-TypeD', that RS may be an SS/PBCH block located in the same or different CC/DL BWP or a CSI-RS resource configured as periodic or semi-persistent located in the same or different CC/DL BWP. The UE applies the QCL assumption when receiving the aperiodic CSI-RS based on a condition on the scheduling offset (δ) between the last symbol of the PDCCH carrying the triggering DCI and the first symbol of the aperiodic CSI-RS resources in a NZP-CSI-RS-ResourceSet configured without higher layer parameter trs-Info and without the higher layer parameter repetition. At least one of the following sub-embodiments can be used. Note that the unit of the scheduling offset (δ) is OFDM symbol(s).

In sub-embodiment 1A, the UE does not expect that the SCS associated with the PDCCH carrying the triggering DCI is greater than the CSI-RS SCS, i.e., $\mu_{PDCCH} \leq \mu_{CSI-RS}$, and the scheduling offset is defined in the numerology of the aperiodic CSI-RS, $\mu_{CSI-RS}$.

When scheduling offset is smaller than a threshold α, i.e., δ<α,
  if there is any other DL signal with an indicated TCI state in the same symbols as the CSI-RS, the UE applies the QCL assumption of the other DL signal also when receiving the aperiodic CSI-RS. The other DL signal refers to PDSCH scheduled with offset larger than or equal to the threshold timeDurationForQCL, as defined in NR specification, aperiodic CSI-RS scheduled with offset larger than or equal to α, when the UE reported threshold beamSwitchTiming is one of the values {14, 28, 48}, periodic CSI-RS, semi-persistent CSI-RS;

else, when receiving the aperiodic CSI-RS, the UE applies the QCL assumption used for the CORESET associated with a monitored search space with the lowest CORESET-ID in the latest slot in which one or more CORESETs within the active BWP of the serving cell are monitored.

When scheduling offset is equal to or greater than the threshold α, i.e., δ≥α, the UE is expected to apply the QCL assumptions in the indicated TCI states for the aperiodic CSI-RS resources in the CSI triggering state indicated by the CSI trigger field in DCI.

The threshold α is determined according to at least one of the following examples.

In one example 1A-1, the threshold α=Y+d, where
Y is the UE reported threshold beamSwitchTiming, as defined in NR specification, which takes a value from a set including {14, 28, 48},
d=0 if the PDCCH SCS is equal the $CSI - RS\ SCS\ (\mu_{PDCCH} = \mu_{CSI-RS})$ and $$d = 14\frac{2^{\mu_{CSIRS}}}{2^{\mu_{PDCCH}}} \text{ or } \left\lceil 14\frac{2^{\mu_{CSIRS}}}{2^{\mu_{PDCCH}}} \right\rceil \text{ or } \left\lfloor 14\frac{2^{\mu_{CSIRS}}}{2^{\mu_{PDCCH}}} \right\rfloor \text{ or }$$

$$14\left\lceil \frac{2^{\mu_{CSIRS}}}{2^{\mu_{PDCCH}}} \right\rceil \text{ or } 14\left\lfloor \frac{2^{\mu_{CSIRS}}}{2^{\mu_{PDCCH}}} \right\rfloor \text{ otherwise.}$$

In one example 1A-2, the threshold α=Y×d, where
Y is defined in example 1A-1, $$d = \frac{2^{\mu_{CSI-RS}}}{2^{\mu_{PDCCH}}} = 2^{\mu_{CSI-RS}-\mu_{PDCCH}} \text{ or}$$

$$d = \left\lceil \frac{2^{\mu_{CSI-RS}}}{2^{\mu_{PDCCH}}} \right\rceil = \lceil 2^{\mu_{CSI-RS}-\mu_{PDCCH}} \rceil \text{ or}$$

$$d = \left\lfloor \frac{2^{\mu_{CSI-RS}}}{2^{\mu_{PDCCH}}} \right\rfloor = \lfloor 2^{\mu_{CSI-RS}-\mu_{PDCCH}} \rfloor.$$

In one example 1A-3, the threshold α=Y×d, where
Y is defined in example 1A-1, $$d = \max\left(1, \frac{2^{\mu_{CSI-RS}}}{2^{\mu_{PDCCH}}}\right) = 2^{\max(0,\mu_{CSI-RS}-\mu_{PDCCH})}.$$

In one example 1A-4, the threshold α=Y+d, where
Y is defined in example 1A-1, $$d = \left(\frac{2^{\mu_{CSI-RS}}}{2^{\mu_{PDCCH}}}\right)M = (2^{\mu_{CSI-RS}-\mu_{PDCCH}})M \text{ or}$$

$$d = \left\lceil \frac{2^{\mu_{CSI-RS}}}{2^{\mu_{PDCCH}}} \right\rceil M = \lceil 2^{\mu_{CSI-RS}-\mu_{PDCCH}} \rceil M \text{ or}$$

$$d = \left\lfloor \frac{2^{\mu_{CSI-RS}}}{2^{\mu_{PDCCH}}} \right\rfloor M = \lfloor 2^{\mu_{CSI-RS}-\mu_{PDCCH}} \rfloor M.$$

In one example 1A-5, the threshold α=Y+d, where
Y is defined in example 1A-1, $$d = \left(\frac{2^{\mu_{CSI-RS}}}{2^{\mu_{PDCCH}}} - 1\right)M = (2^{\mu_{CSI-RS}-\mu_{PDCCH}} - 1)M \text{ or}$$

$$d = \left(\left\lceil \frac{2^{\mu_{CSI-RS}}}{2^{\mu_{PDCCH}}} \right\rceil - 1\right)M = (\lceil 2^{\mu_{CSI-RS}-\mu_{PDCCH}} \rceil - 1)M \text{ or}$$

$$d = \left(\left\lfloor \frac{2^{\mu_{CSI-RS}}}{2^{\mu_{PDCCH}}} \right\rfloor - 1\right)M = (\lfloor 2^{\mu_{CSI-RS}-\mu_{PDCCH}} \rfloor - 1)M.$$

In one example 1A-6, the threshold α=Y+d, where
Y is defined in example 1A-1, $$d = \left(\max\left(1, \frac{2^{\mu_{CSI-RS}}}{2^{\mu_{PDCCH}}}\right) - 1\right)$$

$$M = \max\left(0, \frac{2^{\mu_{CSI-RS}}}{2^{\mu_{PDCCH}}} - 1\right)$$

$$M = (2^{\max(0,\mu_{CSI-RS}-\mu_{PDCCH})} - 1)M.$$

In one example 1A-7, the threshold α=Y+d, where
Y is defined in example 1A-1,
d=0 if $\mu_{PDCCH}=\mu_{CSI-RS}$ and d=M otherwise.

The parameter M in example 1A-4 through 1A-7 is determined according to at least one of the following alternatives (Alt).

In one alternative Alt 1A-0: M=Y.
In one alternative Alt 1A-1: M=14.
In one alternative Alt 1A-2: M=12.
In one alternative Alt 1A-3: M depends on Y; for example, M=14 if Y=14 or 28, and M=12 if Y=48.
In one alternative Alt 1A-4: M depends on $\mu_{CSI-RS}$, for example, M=14 if $\mu_{CSI-RS}\neq 2$, and M=12 if $\mu_{CSI-RS}=2$.
In one alternative Alt 1A-5: M=m OFDM symbols; for example, m is the span, in number of OFDM symbols, of the PDCCH monitoring occasion in which the triggering DCI is received.
In one alternative Alt 1A-6: M=m OFDM symbols, and m is configured, for example, via higher layer or more dynamic MAC CE based or DCI based signaling, either explicitly (using a new state or configuration parameter) or implicitly (using one of the existing states or configuration parameters).
In one alternative Alt 1A-7: M=m OFDM symbols, and m is reported by the UE, for example, as part of the UE capability signaling.
In one alternative Alt 1A-8: M=m OFDM symbols, and m is fixed (e.g., 12 or 14). In one example, m=Δ, where the Δ value is given by at least one of the examples in 3A-6 or 3A-6a. For instance, in another example, the m value is given by the following:
$\mu_{PDCCH}$=0 (i.e., 15 kHz SCS): m=4 symbols;
$\mu_{PDCCH}$=1 (i.e., 30 kHz SCS): m=4 symbols;
$\mu_{PDCCH}$=2 (i.e., 60 kHz SCS): m=8 symbols;
$\mu_{PDCCH}$=3 (i.e., 120 kHz SCS): m=8 or 12 symbols.
In another example, the m value is given by the following:
t=1: m=4 symbols;
t=2: m=4 symbols;
t=4: m=4 symbols;
t=8: m=8 symbols;
t=16: m=8 or 12 symbols;
where $$t = \frac{2^{\mu_{CSI-RS}}}{2^{\mu_{PDCCH}}} \text{ or } \left\lceil \frac{2^{\mu_{CSI-RS}}}{2^{\mu_{PDCCH}}} \right\rceil \text{ or } \left\lfloor \frac{2^{\mu_{CSI-RS}}}{2^{\mu_{PDCCH}}} \right\rfloor.$$

In these examples, the m value can either be without the quantization step (cf. Ex 3A-6a-1) or with the quantization step (cf. Ex 3A-6a-2).

In one example 1A-8, the threshold α=Y(1+d), where
  Y is defined in example 1A-1,
  d is according to one of example 1A-1, 1A-4, 1A-5, 1A-6, or 1A-7.

In one example 1A-9, the threshold $$\alpha = \frac{Y}{d},$$

where
  Y is defined in example 1A-1,
  d is determined according to one of example 1A-1, 1A-4, 1A-5, 1A-6, or 1A-7.

In sub-embodiment 1B, there is no restriction on PDCCH and CSI-RS SCSs, i.e., $\mu_{PDCCH}$ and $\mu_{CSI-RS}$ can take any values, and the scheduling offset is defined in the numerology of the aperiodic CSI-RS $\mu_{CSI-RS}$. The rest of the details are the same as or analogous to those in sub-embodiment 1A (including all examples and alternatives) except that the condition "if the PDCCH SCS is equal the CSI-RS SCS ($\mu_{PDCCH}=\mu_{CSI-RS}$)" in some of the above examples (example 1A-1 through example 1A-9) is replaced with the condition "if the PDCCH SCS is larger than or equal the CSI-RS SCS ($\mu_{PDCCH} \geq \mu_{CSI-RS}$)".

In sub-embodiment 1C, there is no restriction on PDCCH and CSI-RS SCSs, i.e., $\mu_{PDCCH}$ and $\mu_{CSI-RS}$ can take any values. The scheduling offset is defined based on the maximum subcarrier spacing between the PDCCH and the aperiodic CSI-RS. Hence, when $\mu_{PDCCH} \leq \mu_{CS-RS}$, the scheduling offset is defined in the numerology of the aperiodic CSI-RS $\mu_{CSI-RS}$ and the rest of the details are the same as or analogous to those in sub-embodiment 1A (including all examples and alternatives). When $\mu_{PDCCH} > \mu_{CSI-RS}$, the scheduling offset is defined in the numerology of the PDCCH $\mu_{PDCCH}$ and the rest of the details are the same as in sub-embodiment 1A (including all examples and alternatives) except that $\mu_{CSI-RS}$ and $\mu_{PDCCH}$ are swapped everywhere, i.e., $\mu_{CSI-RS}$ is replaced with $\mu_{PDCCH}$ and $\mu_{PDCCH}$ is replaced with $\mu_{CSI-RS}$.

In sub-embodiment 1D, there is no restriction on PDCCH and CSI-RS SCSs, i.e., $\mu_{PDCCH}$ and $\mu_{CSI-RS}$ can take any values. The scheduling offset is defined based on the minimum subcarrier spacing between the PDCCH and the aperiodic CSI-RS. Hence, when $\mu_{PDCCH} > \mu_{CSI-RS}$, the scheduling offset is defined in the numerology of the aperiodic CSI-RS $\mu_{CSI-RS}$ and the rest of the details are the same as or analogous to those in sub-embodiment 1A (including all examples and alternatives). When $\mu_{PDCCH} \leq \mu_{CSI-RS}$, the scheduling offset is defined in the numerology of the PDCCH $\mu_{PDCCH}$ and the rest of the details are the same as or analogous to those in sub-embodiment 1A (including all examples and alternatives) except that $\mu_{CSI-RS}$ and $\mu_{PDCCH}$ are swapped everywhere, i.e., $\mu_{CSI-RS}$ is replaced with $\mu_{PDCCH}$ and $\mu_{PDCCH}$ is replaced with $\mu_{CSI-RS}$.

In one embodiment 2, when aperiodic CSI-RS is used with aperiodic CSI reporting, the CSI-RS triggering offset X is configured per resource set by the higher layer parameter aperiodicTriggeringOffset. The CSI-RS triggering offset has the values of {0, 1, 2, 3, 4, 16, 24} slots. Note that the unit of the CSI-RS triggering offset is slot(s). The aperiodic CSI-RS is transmitted in slot n'+X, where X is the CSI-RS triggering offset in the numerology of CSI-RS according to the higher layer parameter aperiodicTriggeringOffset, and n' is the reference slot used to apply the slot offset for AP-CSI-RS transmission. If all the associated trigger states do not have the higher layer parameter qcl-Type set to 'QCL-TypeD' in the corresponding TCI states and the PDCCH SCS is equal to the CSI-RS SCS, the CSI-RS triggering offset X is fixed to zero.

The value n' depends on whether $\mu_{PDCCH}=\mu_{CSI-RS}$ or $\mu_{PDCCH} \neq \mu_{CSI-RS}$. At least one of the following sub-embodiments can be used.

In one sub-embodiment 2A, the UE does not expect that the SCS associated with the PDCCH carrying the triggering DCI is greater than the CSI-RS SCS, i.e., $\mu_{PDCCH} \leq \mu_{CSI-RS}$, and the slot offset is defined in the numerology of the aperiodic CSI-RS, $\mu_{CSI-RS}$. Let n be the slot with the triggering DCI in the numerology of the PDCCH containing the triggering DCI. The reference slot n' is then determined according to at least one of the following examples.

In one example 2A-1,
  n'=n if the PDCCH SCS is equal to the CSI-RS SCS ($\mu_{PDCCH}=\mu_{CSI-RS}$) and $$n' = (n+1)\frac{2^{\mu_{CSIRS}}}{2^{\mu_{PDCCH}}} \text{ or } \left\lceil (n+1)\frac{2^{\mu_{CSIRS}}}{2^{\mu_{PDCCH}}} \right\rceil \text{ or } \left\lfloor (n+1)\frac{2^{\mu_{CSIRS}}}{2^{\mu_{PDCCH}}} \right\rfloor \text{ otherwise.}$$

In one example 2A-2, $$n' = n \text{ if } \mu_{PDCCH} = \mu_{CSI-RS}$$
$$n' = (n+1)\frac{2^{\mu_{CSI-RS}}}{2^{\mu_{PDCCH}}} - 1 \text{ or } \left\lceil (n+1)\frac{2^{\mu_{CSI-RS}}}{2^{\mu_{PDCCH}}} - 1 \right\rceil \text{ or}$$
$$\left\lfloor (n+1)\frac{2^{\mu_{CSI-RS}}}{2^{\mu_{PDCCH}}} - 1 \right\rfloor \text{ otherwise.}$$

In one example 2A-3, $$n' = n \times \frac{2^{\mu_{CSI-RS}}}{2^{\mu_{PDCCH}}} = n \times 2^{\mu_{CSI-RS}-\mu_{PDCCH}} \text{ or}$$
$$n' = \left\lceil n \times \frac{2^{\mu_{CSI-RS}}}{2^{\mu_{PDCCH}}} \right\rceil = \lceil n \times 2^{\mu_{CSI-RS}-\mu_{PDCCH}} \rceil \text{ or}$$
$$n' = \left\lfloor n \times \frac{2^{\mu_{CSI-RS}}}{2^{\mu_{PDCCH}}} \right\rfloor = \lfloor n \times 2^{\mu_{CSI-RS}-\mu_{PDCCH}} \rfloor.$$

In one example 2A-4, $$n' = (n+1)\frac{2^{\mu_{CSI-RS}}}{2^{\mu_{PDCCH}}} = (n+1)2^{\mu_{CSI-RS}-\mu_{PDCCH}} \text{ or}$$
$$n' = \left\lceil (n+1)\frac{2^{\mu_{CSI-RS}}}{2^{\mu_{PDCCH}}} \right\rceil = \lceil (n+1)2^{\mu_{CSI-RS}-\mu_{PDCCH}} \rceil \text{ or}$$
$$n' = \left\lfloor (n+1)\frac{2^{\mu_{CSI-RS}}}{2^{\mu_{PDCCH}}} \right\rfloor = \lfloor (n+1)2^{\mu_{CSI-RS}-\mu_{PDCCH}} \rfloor.$$

In one example 2A-5, $$n' = n \times \max\left(1, \frac{2^{\mu_{CSI-RS}}}{2^{\mu_{PDCCH}}}\right) = n \times 2^{\max(0, \mu_{CSI-RS}-\mu_{PDCCH})}.$$

In one example 2A-6, $$n' = (n+1)\max\left(1, \frac{2^{\mu_{CSI-RS}}}{2^{\mu_{PDCCH}}}\right) = (n+1)2^{\max(0,\mu_{CSI-RS}-\mu_{PDCCH})}.$$

In one example 2A-7

$$n' = (n+e)\frac{2^{\mu_{CSI-RS}}}{2^{\mu_{PDCCH}}} = (n+e)2^{\mu_{CSI-RS}-\mu_{PDCCH}} \text{ or}$$

$$n' = \left\lceil (n+e)\frac{2^{\mu_{CSI-RS}}}{2^{\mu_{PDCCH}}} \right\rceil = \lceil (n+e)2^{\mu_{CSI-RS}-\mu_{PDCCH}} \rceil \text{ or}$$

$$n' = \left\lfloor (n+e)\frac{2^{\mu_{CSI-RS}}}{2^{\mu_{PDCCH}}} \right\rfloor = \lfloor (n+e)2^{\mu_{CSI-RS}-\mu_{PDCCH}} \rfloor,$$

where e is an indicator which takes a value e=0 when $\mu_{PDCCH}=\mu_{CSI-RS}$ and another value e=1 otherwise.

In one example 2A-8, $$n' = (n+e)\max\left(1, \frac{2^{\mu_{CSI-RS}}}{2^{\mu_{PDCCH}}}\right) = (n+e)2^{\max(0,\mu_{CSI-RS}-\mu_{PDCCH})},$$

where e is an indicator which takes a value e=0 when $\mu_{PDCCH}=\mu_{CSI-RS}$ and another value e=1 otherwise.

In one sub-embodiment 2B, there is no restriction on PDCCH and CSI-RS SCSs, i.e., $\mu_{PDCCH}$ and $\mu_{CSI-RS}$ can take any values, and the slot offset is defined in the numerology of the aperiodic CSI-RS $\mu_{CSI-RS}$. The rest of the details are the same as or analogous to those in sub-embodiment 2A (including all examples and alternatives) except that the condition "if the PDCCH SCS is equal the CSI-RS SCS ($\mu_{PDCCH}=\mu_{CSI-RS}$)" in some of the above examples (example 2A-1 through example 2A-8) is replaced with the condition "if the PDCCH SCS is larger than or equal the CSI-RS SCS ($\mu_{PDCCH}\geq\mu_{CSI-RS}$)".

In one sub-embodiment 2C, there is no restriction on PDCCH and CSI-RS SCSs, i.e., $\mu_{PDCCH}$ and $\mu_{CSI-RS}$ can take any values. The slot offset is defined based on the maximum subcarrier spacing between the PDCCH and the aperiodic CSI-RS. Hence, when $\mu_{PDCCH}\leq\mu_{CSI-RS}$, the slot offset is defined in the numerology of the aperiodic CSI-RS $\mu_{CSI-RS}$ and the rest of the details are the same as or analogous to those in sub-embodiment 2A (including all examples and alternatives). When $\mu_{PDCCH}>\mu_{CSI-RS}$, the slot offset is defined in the numerology of the PDCCH $\mu_{PDCCH}$ and the rest of the details are the same as or analogous to those in sub-embodiment 2A (including all examples and alternatives) except that $\mu_{CSI-RS}$ and $\mu_{PDCCH}$ are swapped everywhere, i.e., $\mu_{CSI-RS}$ is replaced with $\mu_{PDCCH}$ and $\mu_{PDCCH}$ is replaced with $\mu_{CSI-RS}$.

In one sub-embodiment 2D, there is no restriction on PDCCH and CSI-RS SCSs, i.e., $\mu_{PDCCH}$ and $\mu_{CSI-RS}$ can take any values. The slot offset is defined based on the minimum subcarrier spacing between the PDCCH and the aperiodic CSI-RS. Hence, when $\mu_{PDCCH}>\mu_{CSI-RS}$, the slot offset is defined in the numerology of the aperiodic CSI-RS $\mu_{CSI-RS}$ and the rest of the details are the same as or analogous to those in sub-embodiment 2A (including all examples and alternatives). When $\mu_{PDCCH}\leq\mu_{CSI-RS}$, the slot offset is defined in the numerology of the PDCCH $\mu_{PDCCH}$ and the rest of the details are the same as or analogous to those in sub-embodiment 2A (including all examples and alternatives) except that $\mu_{CSI-RS}$ and $\mu_{PDCCH}$ are swapped everywhere, i.e., $\mu_{CSI-RS}$ is replaced with $\mu_{PDCCH}$ and $\mu_{PDCCH}$ is replaced with $\mu_{CSI-RS}$.

In one sub-embodiment 2E, the CSI-RS triggering offset X in some embodiments of this disclosure, takes a value from a set S, where the unit for X is slots in the numerology of the CSI-RS, and the set S includes {0, 1, 2, 3, 4, 16, 24}. The set S also includes additional values in an another set T, where the another set T is according to at least one of the following alternatives.

In one alternative Alt 2E-1: T is empty, i.e., the set S={0, 1, 2, 3, 4, 16, 24}.

In one alternative Alt 2E-2: T={5, 6, . . . , 15, 17, 18, . . . , 23, 25, 26, . . . , Z}, i.e., the set S={0, 1, 2, 3, 4, . . . , Z}. Here, Z is either fixed (e.g., to 31 or 32) or configured (e.g., from 31 or 32).

In one alternative Alt 2E-3: T {5, 6, . . . , 15, 17, 18, . . . , Z}, i.e., the set S={0, 1, 2, 3, 4, . . . , Z}. Here, Z is either fixed (e.g., to 24 or 31 or 32) or configured (e.g., from 24 or 32).

In one alternative Alt 2E-4: T={8}, i.e., the set S={0, 1, 2, 3, 4, 8, 16, 24}.

In one alternative Alt 2E-5: T={6, 8}, i.e., the set S={0, 1, 2, 3, 4, 6, 8, 16, 24}.

In one alternative Alt 2E-6: T={8, 12}, i.e., the set S={0, 1, 2, 3, 4, 8, 12, 16, 24}.

In one alternative Alt 2E-7: T={8, 32}, i.e., the set S={0, 1, 2, 3, 4, 8, 16, 24, 32}.

In one alternative Alt 2E-8: T={6, 8, 12}, i.e., the set S={0, 1, 2, 3, 4, 6, 8, 12, 16, 24}.

In one alternative Alt 2E-9: T={8, 12, 32}, i.e., the set S={0, 1, 2, 3, 4, 8, 12, 16, 24, 32}.

In one alternative Alt 2E-10: T={6, 8, 12, 32}, i.e., the set S={0, 1, 2, 3, 4, 6, 8, 12, 16, 24, 32}.

In one alternative Alt 2E-11: T={Z}, i.e., the set S={0, 1, 2, 3, 4, 16, 24, Z}. Here, Z is either fixed (e.g., to a value from {6, 8, 12, 32}) or configured (e.g., from {6, 8, 12, 32}).

In one alternative Alt 2E-12: T={$Z_1, Z_2$}, i.e., the set S={0, 1, 2, 3, 4, 16, 24, $Z_1, Z_2$}. Here, $Z_1$ and $Z_2$ are either fixed (e.g., to two values from {6, 8, 12, 32}) or configured (e.g., from {6, 8, 12, 32}).

In one alternative Alt 2E-13: T={$Z_1, Z_2, Z_3$}, i.e., the set S={0, 1, 2, 3, 4, 16, 24, $Z_1, Z_2, Z_3$}. Here, $Z_1, Z_2$, and $Z_3$ are either fixed (e.g., to three values from {6, 8, 12, 32}) or configured (e.g., from {6, 8, 12, 32}).

In one alternative Alt 2E-14: T={$Z_1, Z_2, Z_3, Z_4$}, i.e., the set S={0, 1, 2, 3, 4, 16, 24, $Z_1, Z_2, Z_3, Z_4$}. Here, $Z_1, Z_2, Z_3$, and $Z_4$ are either fixed (e.g., to four values from {6, 8, 12, 20, 28, 32}) or configured (e.g., from {6, 8, 12, 20, 28, 32}).

In one sub-embodiment 2F, the set S includes additional values according to Alt 2E-1 through Alt 2E-14 of sub-embodiment 2E only when a certain condition is satisfied. For example, the certain condition can be based on the values for $\mu_{PDCCH}$ and $\mu_{CSI-RS}$. At least one of the following alternatives can be used for the certain condition.

In one alternative Alt 2F-1, the set S includes additional values in the set T for both cases when $\mu_{PDCCH}>\mu_{CSI-RS}$ and $\mu_{PDCCH}<\mu_{CSI-RS}$, where the set T is the same for both cases when $\mu_{PDCCH}>\mu_{CSI-RS}$ and $\mu_{PDCCH}<\mu_{CSI-RS}$, and is according to at least one of Alt 2E-1 through Alt 2E-13. When $\mu_{PDCCH}=\mu_{CSI-RS}$, the set S={0, 1, 2, 3, 4, 16, 24}.

In one alternative Alt 2F-1a, the set S includes additional values in the set T for both cases when $\mu_{PDCCH}>\mu_{CSI-RS}$ and $\mu_{PDCCH}<\mu_{CSI-RS}$, where the set T can be different for both cases when $\mu_{PDCCH}>\mu_{CSI-RS}$ and $\mu_{PDCCH}<\mu_{CSI-RS}$, and is according to at least one of Alt 2E-1 through Alt 2E-13. When $\mu_{PDCCH}=\mu_{CSI-RS}$, the set S={0, 1, 2, 3, 4, 16, 24}.

In one alternative Alt 2F-2, the set S includes additional values in the set T for both cases when $\mu_{PDCCH}>\mu_{CSI-RS}$ and $\mu_{PDCCH}\le\mu_{CSI-RS}$, where the set T is the same for both cases when $\mu_{PDCCH}>\mu_{CSI-RS}$ and $\mu_{PDCCH}\le\mu_{CSI-RS}$, and is according to at least one of Alt 2E-1 through Alt 2E-13.

In one alternative Alt 2F-2a, the set S includes additional values in the set T for both cases when $\mu_{PDCCH}>\mu_{CSI-RS}$ and $\mu_{PDCCH}\le\mu_{CSI-RS}$, where the set T can be different for both cases when $\mu_{PDCCH}>\mu_{CSI-RS}$ and $\mu_{PDCCH}\le\mu_{CSI-RS}$, and is according to at least one of Alt 2E-1 through Alt 2E-13.

In one alternative Alt 2F-3, the set S includes additional values in the set T for both cases when $\mu_{PDCCH}\ge\mu_{CSI-RS}$ and $\mu_{PDCCH}<$, where the set T is the same for both cases when $\mu_{PDCCH}\ge\mu_{CSI-RS}$ and $\mu_{PDCCH}<\mu_{CSI-RS}$, and is according to at least one of Alt 2E-1 through Alt 2E-13.

In one alternative Alt 2F-3a, the set S includes additional values in the set T for both cases when $\mu_{PDCCH}\ge\mu_{CSI-RS}$ and $\mu_{PDCCH}<\mu_{CSI-RS}$, where the set T can be different for both cases when $\mu_{PDCCH}\ge\mu_{CSI-RS}$ and $\mu_{PDCCH}<\mu_{CSI-RS}$, and is according to at least one of Alt 2E-1 through Alt 2E-13.

In one alternative Alt 2F-4, the set S includes additional values in the set T only when $\mu_{PDCCH}>\mu_{CSI-RS}$, where the set T is according to at least one of Alt 2E-1 through Alt 2E-13. When $\mu_{PDCCH}<\mu_{CSI-RS}$, the set S={0, 1, 2, 3, 4, 16, 24}.

In one alternative Alt 2F-5, the set S includes additional values in the set T only when $\mu_{PDCCH}<\mu_{CSI-RS}$, where the set T is according to at least one of Alt 2E-1 through Alt 2E-13. When $\mu_{PDCCH}>\mu_{CSI-RS}$, the set S={0, 1, 2, 3, 4, 16, 24}.

In one alternative Alt 2F-6, the set S includes additional values in the set T only when $\mu_{PDCCH}\ge\mu_{CSI-RS}$, where the set T is according to at least one of Alt 2E-1 through Alt 2E-13. When $\mu_{PDCCH}<\mu_{CSI-RS}$, the set S={0, 1, 2, 3, 4, 16, 24}.

In one alternative Alt 2F-7, the set S includes additional values in the set T only when $\mu_{PDCCH}\le\mu_{CSI-RS}$, where the set T is according to at least one of Alt 2E-1 through Alt 2E-13. When $\mu_{PDCCH}>\mu_{CSI-RS}$, the set S={0, 1, 2, 3, 4, 16, 24}.

In one alternative Alt 2F-8, the set S includes additional values in the set T only when $\mu_{PDCCH}>\mu_{CSI-RS}$, where the set T is according to at least one of Alt 2E-1 through Alt 2E-13. When $\mu_{PDCCH}\le\mu_{CSI-RS}$, the set S={0, 1, 2, 3, 4, 16, 24}.

In one alternative Alt 2F-9, the set S includes additional values in the set T only when $\mu_{PDCCH}<\mu_{CSI-RS}$, where the set T is according to at least one of Alt 2E-1 through Alt 2E-13. When $\mu_{PDCCH}\ge\mu_{CSI-RS}$, the set S={0, 1, 2, 3, 4, 16, 24}.

In one embodiment 3, let k be the number of (OFDM) symbols between the end of the PDCCH containing the triggering DCI and the CSI-RS. In order to avoid too short time between DCI decoding and start receiving the triggered CSI-RS at the UE, which could happen if k is too small, the UE processing can be relaxed. At least one of the following embodiments can be used for this purpose.

In one sub-embodiment 3A, the UE does not expect that the SCS associated with the PDCCH carrying the triggering DCI is greater than the CSI-RS SCS, i.e., $\mu_{PDCCH}\le\mu_{CSI-RS}$, and the UE processing relaxation is defined in the numerology of the aperiodic CSI-RS, $\mu_{CSI-RS}$. In one example, the UE processing relaxation is performed regardless of the values for $\mu_{PDCCH}$ and $\mu_{CSI-RS}$. In another example, when $\mu_{PDCCH}=\mu_{CSI-RS}$, no processing relaxation is performed, and when $\mu_{PDCCH}<\mu_{CSI-RS}$, the UE processing relaxation is performed according to at least one of the following examples.

In one example 3A-1, the UE does not expect that the PDCCH carrying the triggering DCI is contained in the last x symbols of the slot (in CSI-RS numerology), i.e., k≥x. In one example, x=10.

In one example 3A-2, the UE is not required to process aperiodic CSI-RS if there are less than $$m\times\frac{2^{\mu_{CSI-RS}}}{2^{\mu_{PDCCH}}} \text{ or } \left\lceil m\times\frac{2^{\mu_{CSI-RS}}}{2^{\mu_{PDCCH}}}\right\rceil \text{ or } \left\lfloor m\times\frac{2^{\mu_{CSI-RS}}}{2^{\mu_{PDCCH}}}\right\rfloor$$

symbols between the end of the PDCCH containing the triggering DCI and the beginning of CSI-RS, i.e.

$$k<m\times\frac{2^{\mu_{CSI-RS}}}{2^{\mu_{PDCCH}}} \text{ or } \left\lceil m\times\frac{2^{\mu_{CSI-RS}}}{2^{\mu_{PDCCH}}}\right\rceil \text{ or } \left\lfloor m\times\frac{2^{\mu_{CSI-RS}}}{2^{\mu_{PDCCH}}}\right\rfloor.$$

Here, m is defined according to at least one of Alt1A-5, Alt1A-6, Alt1A-7, and Alt1A-8 or m is fixed.

In one example 3A-3, the CSI-RS triggering offset X is always larger than zero.

In one example 3A-4, the UE processing is relaxed by y slots in CSI-RS numerology. In one example, y=1.

In one example 3A-5, the slot offset is applied as follows.
slot offset=max(1,X) if $\mu_{PDCCH}\ne\mu_{CSI-RS}$, and
slot offset=X if $\mu_{PDCCH}\ne\mu_{CSI-RS}$.

In one example 3A-6, the UE processing relaxation is based on choosing an appropriate Beamswitchtiming Y (cf. embodiment 1).

In one example 3A-6a, the UE processing relaxation is based on defining the earliest possible starting point for the CSI-RS transmission/reception (T). In one example, T=the end of the PDCCH+$\Delta$ or the end of the PDCCH+$\Delta\times$t, where $$t=\frac{2^{\mu_{CSI-RS}}}{2^{\mu_{PDCCH}}} \text{ or } \left\lceil\frac{2^{\mu_{CSI-RS}}}{2^{\mu_{PDCCH}}}\right\rceil \text{ or } \left\lfloor\frac{2^{\mu_{CSI-RS}}}{2^{\mu_{PDCCH}}}\right\rfloor$$

and $\Delta$ is defined according to at least one of the following examples.

In one example Ex 3A-6a-1: The $\Delta$ is determined as a number of symbols based on CSI-RS SCS counting from the end of the last symbol of the received PDCCH symbol to the beginning of the first symbol of the corresponding received CSI-RS, i.e., the UE is expected to be able to measure the aperiodic CSI RS, if the CSI-RS starts no earlier than at least $\Delta$=Ncsirs PDCCH symbols after the end of the PDCCH triggering the aperiodic CSI-RS.

In one example Ex 3A-6a-2: The $\Delta$ is determined as a number of symbols based on CSI-RS SCS counting from the end of the last symbol of the received PDCCH symbol to the beginning of the first symbol of the corresponding received CSI-RS, which is quantized (using the granularity of CSI-RS slot duration) to the next CSI-RS slot boundary, i.e., the UE is expected to be able to measure the aperiodic CSI RS, if the CSI-RS starts no earlier than the first symbol of the CSI-RS carrier's slot that starts at least $\Delta$=Ncsirs PDCCH symbols after the end of the PDCCH triggering the aperiodic CSI-RS.

When $\mu_{PDCCH}>\mu_{CSI-RS}$, for the UE processing relaxation time (T), the definition Ex 3A-6a-1 is used.

In one example, the $\Delta$ value is given by the following:
$\mu_{PDCCH}=0$ (i.e., 15 kHz SCS): $\Delta$=4 symbols;
$\mu_{PDCCH}=1$ (i.e., 30 kHz SCS): $\Delta$=4 symbols;
$\mu_{PDCCH}=2$ (i.e., 60 kHz SCS): $\Delta$=8 symbols;
$\mu_{PDCCH}=3$ (i.e., 120 kHz SCS): $\Delta$=8 or 12 symbols.

In another example, the Δ value is given by the following:
t=1: Δ=4 symbols;
t=2: Δ=4 symbols;
t=4: Δ=4 symbols;
t=8: Δ=8 symbols;
t=16: Δ=8 or 12 symbols;
where $$t = \frac{2^{\mu_{CSI-RS}}}{2^{\mu_{PDCCH}}} \text{ or } \left\lceil \frac{2^{\mu_{CSI-RS}}}{2^{\mu_{PDCCH}}} \right\rceil \text{ or } \left\lfloor \frac{2^{\mu_{CSI-RS}}}{2^{\mu_{PDCCH}}} \right\rfloor.$$

In another example, the Δ value is given by m×t, where $$t = \frac{2^{\mu_{CSI-RS}}}{2^{\mu_{PDCCH}}} \text{ or } \left\lceil \frac{2^{\mu_{CSI-RS}}}{2^{\mu_{PDCCH}}} \right\rceil \text{ or } \left\lfloor \frac{2^{\mu_{CSI-RS}}}{2^{\mu_{PDCCH}}} \right\rfloor$$

and m is fixed, for example, to 4.

In another example, the Δ value is fixed, for example, to 4.

In these examples, the Δ value can either be without the quantization step (Ex 3A-6a-1) or with the quantization step (Ex 3A-6a-2).

In one example 3A-7, the UE processing relaxation depends on the value X∈{0, . . . , 4, 16, 24} of aperiodic-TriggeringOffset
  If X=0, the relaxation is performed according to at least one of Example 3A-1 through 3A-6 or 3A-6a.
  If X>0, no processing relaxation is performed.

In one sub-embodiment 3AA, the UE does not expect that the SCS associated with the PDCCH carrying the triggering DCI is greater than the CSI-RS SCS, i.e., $\mu_{PDCCH} \leq \mu_{CSI-RS}$, and the UE processing relaxation is defined in the numerology of the PDCCH, $\mu_{PDCCH}$. In one example, the UE processing relaxation is performed regardless of the values for $\mu_{PDCCH}$ and $\mu_{CSI-RS}$. In another example, when $\mu_{PDCCH} = \mu_{CSI-RS}$, no processing relaxation is performed, and when $\mu_{PDCCH} < \mu_{CSI-RS}$, the UE processing relaxation is performed according to at least one of the following examples.

In one example 3AA-1, the UE does not expect that the PDCCH carrying the triggering DCI is contained in the last x symbols of the slot (in PDCCH numerology), i.e., k≥x. In one example, x=10.

In one example 3AA-2, the UE is not required to process aperiodic CSI-RS if there are less than $$m \times \frac{2^{\mu_{CSI-RS}}}{2^{\mu_{PDCCH}}} \text{ or } \left\lceil m \times \frac{2^{\mu_{CSI-RS}}}{2^{\mu_{PDCCH}}} \right\rceil \text{ or } \left\lfloor m \times \frac{2^{\mu_{CSI-RS}}}{2^{\mu_{PDCCH}}} \right\rfloor$$

symbols between the end of the PDCCH containing the triggering DCI and the beginning of CSI-RS, i.e., $$k < m \times \frac{2^{\mu_{CSI-RS}}}{2^{\mu_{PDCCH}}} \text{ or } \left\lceil m \times \frac{2^{\mu_{CSI-RS}}}{2^{\mu_{PDCCH}}} \right\rceil \text{ or } \left\lfloor m \times \frac{2^{\mu_{CSI-RS}}}{2^{\mu_{PDCCH}}} \right\rfloor.$$

Here, m is defined according to at least one of Alt1A-5, Alt1A-6, and Alt1A-7 or m is fixed.

In one example 3AA-3, the CSI-RS triggering offset X is always larger than zero.

In one example 3AA-4, the UE processing is relaxed by y slots in PDCCH numerology. In one example, y=1.

In one example 3AA-5, the slot offset is applied as follows.
  slot offset=max(1,X) if $\mu_{PDCCH} \neq \mu_{CSI-RS}$, and
  slot offset=X if $\mu_{PDCCH} = \mu_{CSI-RS}$.

In one example 3AA-6, the UE processing relaxation is based on choosing an appropriate Beamswitchtiming Y (cf. embodiment 1).

In one example 3AA-6a, the UE processing relaxation is based on defining the earliest possible starting point for the CSI-RS transmission/reception (T). In one example, T=the end of the PDCCH+Δ, or the end of the PDCCH+Δ×t, where $$t = \frac{2^{\mu_{CSI-RS}}}{2^{\mu_{PDCCH}}} \text{ or } \left\lceil \frac{2^{\mu_{CSI-RS}}}{2^{\mu_{PDCCH}}} \right\rceil \text{ or } \left\lfloor \frac{2^{\mu_{CSI-RS}}}{2^{\mu_{PDCCH}}} \right\rfloor$$

and Δ is defined according to at least one of the following examples.

In one example Ex 3AA-6a-1: The Δ is determined as a number of symbols based on PDCCH SCS counting from the end of the last symbol of the received PDCCH symbol to the beginning of the first symbol of the corresponding received CSI-RS, i.e., the UE is expected to be able to measure the aperiodic CSI RS, if the CSI-RS starts no earlier than at least Δ=Ncsirs PDCCH symbols after the end of the PDCCH triggering the aperiodic CSI-RS.

In one example Ex 3AA-6a-2: The Δ is determined as a number of symbols based on PDCCH SCS counting from the end of the last symbol of the received PDCCH symbol to the beginning of the first symbol of the corresponding received CSI-RS, which is quantized (using the granularity of CSI-RS slot duration) to the next CSI-RS slot boundary, i.e., the UE is expected to be able to measure the aperiodic CSI RS, if the CSI-RS starts no earlier than the first symbol of the CSI-RS carrier's slot that starts at least Δ=Ncsirs PDCCH symbols after the end of the PDCCH triggering the aperiodic CSI-RS.

When $\mu_{PDCCH} > \mu_{CSI-RS}$, for the UE processing relaxation time (T), the definition Ex 3AA-6a-1 is used.

In one example, the Δ value is given by the following:
$\mu_{PDCCH}=0$ (i.e., 15 kHz SCS): Δ=4 symbols;
$\mu_{PDCCH}=1$ (i.e., 30 kHz SCS): Δ=4 symbols;
$\mu_{PDCCH}=2$ (i.e., 60 kHz SCS): Δ=8 symbols;
$\mu_{PDCCH}=3$ (i.e., 120 kHz SCS): Δ=8 or 12 symbols.

In another example, the A value is given by the following:
t=1: Δ=4 symbols;
t=2: Δ=4 symbols;
t=4: Δ=4 symbols;
t=8: Δ=8 symbols;
t=16: Δ=8 or 12 symbols;
where $$t = \frac{2^{\mu_{CSI-RS}}}{2^{\mu_{PDCCH}}} \text{ or } \left\lceil \frac{2^{\mu_{CSI-RS}}}{2^{\mu_{PDCCH}}} \right\rceil \text{ or } \left\lfloor \frac{2^{\mu_{CSI-RS}}}{2^{\mu_{PDCCH}}} \right\rfloor.$$

In another example, the A value is given by m×t, where $$t = \frac{2^{\mu_{CSI-RS}}}{2^{\mu_{PDCCH}}} \text{ or } \left\lceil \frac{2^{\mu_{CSI-RS}}}{2^{\mu_{PDCCH}}} \right\rceil \text{ or } \left\lfloor \frac{2^{\mu_{CSI-RS}}}{2^{\mu_{PDCCH}}} \right\rfloor$$

and m is fixed, for example, to 4.

In another example, the Δ value is fixed, for example, to 4 or 8.

In these examples, the Δ value can either be without the quantization step (Ex 3AA-6a-1) or with the quantization step (Ex 3AA-6a-2).

In example 3AA-7, the UE processing relaxation depends on the value $X \in \{0, \ldots, 4, 16, 24\}$ of aperiodicTriggeringOffset If X=0, the relaxation is performed according to at least one of Example 3AA-1 through 3AA-6 or 3AA-6a.

If X>0, no processing relaxation is performed.

In one sub-embodiment 3B, there is no restriction on PDCCH and CSI-RS SCSs, i.e., $\mu_{PDCCH}$ and $\mu_{CSI-RS}$ can take any values, and the UE processing relaxation is defined in the numerology of the aperiodic CSI-RS $\mu_{CSI-RS}$. The rest of the details are the same as or analogous to those in sub-embodiment 3A/3AA (including all examples and alternatives) except that the condition "if the PDCCH SCS is equal the CSI-RS SCS ($\mu_{PDCCH} = \mu_{CSI-RS}$)" in some of the above examples (example 3A-1/3AA-1 through example 3A-7/3AA-7) is replaced with the condition "if the PDCCH SCS is larger than or equal the CSI-RS SCS ($\mu_{PDCCH} \geq \mu_{CSI-RS}$)".

In one sub-embodiment 3C, there is no restriction on PDCCH and CSI-RS SCSs, i.e., $\mu_{PDCCH}$ and $\mu_{CSI-RS}$ can take any values. The UE processing relaxation is defined based on the maximum subcarrier spacing between the PDCCH and the aperiodic CSI-RS. Hence, when $\mu_{PDCCH} \leq \mu_{CSI-RS}$, the UE processing relaxation is defined in the numerology of the aperiodic CSI-RS $\mu_{CSI-RS}$ and the rest of the details are the same as or analogous to those in sub-embodiment 3A (including all examples and alternatives). When $\mu_{PDCCH} > \mu_{CSI-RS}$, the UE processing relaxation is defined in the numerology of the PDCCH $\mu_{PDCCH}$ and the rest of the details are the same as or analogous to those in sub-embodiment 3A (including all examples and alternatives) except that $\mu_{CSI-RS}$ and $\mu_{PDCCH}$ are swapped everywhere, i.e., $\mu_{CSI-RS}$ is replaced with $\mu_{PDCCH}$ and $\mu_{PDCCH}$ is replaced with $\mu_{CSI-RS}$.

In one sub-embodiment 3D, there is no restriction on PDCCH and CSI-RS SCSs, i.e., $\mu_{PDCCH}$ and $\mu_{CSI-RS}$ can take any values. The UE processing relaxation is defined based on the minimum subcarrier spacing between the PDCCH and the aperiodic CSI-RS. Hence, when $\mu_{PDCCH} > \mu_{CSI-RS}$, the UE processing relaxation is defined in the numerology of the aperiodic CSI-RS $\mu_{CSI-RS}$ and the rest of the details are the same as or analogous to those in sub-embodiment 3A (including all examples and alternatives). When $\mu_{PDCCH} \leq \mu_{CSI-RS}$, the UE processing relaxation is defined in the numerology of the PDCCH $\mu_{PDCCH}$ and the rest of the details are the same as or analogous to those in sub-embodiment 3A (including all examples and alternatives) except that $\mu_{CSI-RS}$ and $\mu_{PDCCH}$ are swapped everywhere, i.e., $\mu_{CSI-RS}$ is replaced with $\mu_{PDCCH}$ and $\mu_{PDCCH}$ is replaced with $\mu_{CSI-RS}$.

In one embodiment 4A, the PDCCH containing the triggering DCI triggers an AP-SRS transmission by the UE. The embodiments 1 through 3 (on AP-CSI-RS reception) can be used (analogously) for AP-SRS transmission by the UE in a straightforward manner.

Regarding AP-SRS, for a UE configured with one or more SRS resource configuration(s), and when the higher layer parameter resourceType in SRS-Resource is set to 'aperiodic':

the UE receives a configuration of SRS resource sets;
the UE receives a downlink DCI, a group common DCI, or an uplink DCI based command where a codepoint of the DCI may trigger one or more SRS resource set(s).

For SRS in a resource set with usage set to 'codebook' or 'antennaSwitching', the minimal time interval between the last symbol of the PDCCH triggering the aperiodic SRS transmission and the first symbol of SRS resource is $N_2$. Otherwise, the minimal time interval between the last symbol of the PDCCH triggering the aperiodic SRS transmission and the first symbol of SRS resource is $N_2+14$. The minimal time interval in units of OFDM symbols is counted based on the minimum subcarrier spacing between the PDCCH and the aperiodic SRS.

If the UE receives the DCI triggering aperiodic SRS in slot n, the UE transmits aperiodic SRS in each of the triggered SRS resource set(s) in slot $$\left\lfloor n \cdot \frac{2^{\mu_{SRS}}}{2^{\mu_{PDCCH}}} \right\rfloor + X,$$

where k is configured via higher layer parameter slotOffset for each triggered SRS resources set and is based on the subcarrier spacing of the triggered SRS transmission, µSRS and µPDCCH are the subcarrier spacing configurations for triggered SRS and PDCCH carrying the triggering command respectively.

According to this embodiment, the minimal time interval in units of OFDM symbols is counted based on the minimum subcarrier spacing between the PDCCH and the aperiodic SRS. Alternatively, the minimal time interval between the last symbol of the PDCCH triggering the aperiodic SRS transmission and the first symbol of SRS resource is $t=N_2+z \times p$ or $t=(N_2+z) \times p$, where z=0 for SRS in a resource set with usage set to 'codebook' or 'antennaSwitching', and z=X>0 otherwise (i.e., for SRS in a resource set with usage set to 'nonCodebook' or 'beamManagement'). In one example X=14. The parameter p is determined according to at least one of the following examples.

In one example, $$p = \frac{2^{\mu_{SRS}}}{2^{\mu_{PDCCH}}} \text{ or } \left\lceil \frac{2^{\mu_{SRS}}}{2^{\mu_{PDCCH}}} \right\rceil \text{ or } \left\lfloor \frac{2^{\mu_{SRS}}}{2^{\mu_{PDCCH}}} \right\rfloor \text{ or } \left\lceil \frac{2^{\mu_{SRS}}}{2^{\mu_{PDCCH}}} \right\rceil \text{ or } \left\lfloor \frac{2^{\mu_{SRS}}}{2^{\mu_{PDCCH}}} \right\rfloor.$$

In another example, $p=(2^{\mu_{SRS}-\mu_{PDCCH}})$ or $p=\lceil 2^{\mu_{SRS}-\mu_{PDCCH}} \rceil$ or $p=\lfloor 2^{\mu_{SRS}-\mu_{PDCCH}} \rfloor$.

In another example, $$p = \max\left(1, \frac{2^{\mu_{SRS}}}{2^{\mu_{PDCCH}}}\right) = 2^{\max(0, \mu_{SRS}-\mu_{PDCCH})}.$$

Likewise, if the UE receives the DCI triggering aperiodic SRS in slot n, the UE transmits aperiodic SRS in each of the triggered SRS resource set(s) in slot n'+k where k is configured via higher layer parameter slotOffset for each triggered SRS resources set and n' is determined according to at least one examples 2A-1 through 2A-8 except that $\mu_{CSI-RS}$ needs to be replaced with $\mu_{SRS}$ in these examples.

In one embodiment 4B, the PDCCH containing the triggering DCI triggers an aperiodic DL RS (e.g., CSI-RS) reception by the UE. The embodiments 1 through 3 (on AP-CSI-RS reception) can be used (analogously) for aperiodic DL RS (e.g., CSI-RS) reception by the UE in a straightforward manner.

In one embodiment 4C, the PDCCH containing the triggering DCI triggers an aperiodic UL RS (e.g., SRS) transmission by the UE. The embodiments 1 through 3 (on AP-CSI-RS reception) can be used (analogously) for aperiodic UL RS (e.g., SRS) transmission by the UE in a straightforward manner.

The UE may be configured with non-codebook based UL transmission when the higher layer parameter txConfig is set to 'nonCodebook'.

For non-codebook based transmission, PUSCH can be scheduled by DCI format 0_0, DCI format 0_1 or semi-statically configured to operate. The UE can determine its PUSCH precoder and transmission rank based on the SRI when multiple SRS resources are configured, where the SRI is given by the SRS resource indicator in DCI, or the SRI is given by srs-ResourceIndicator. The UE may use one or multiple SRS resources for SRS transmission, where, in an SRS resource set, the maximum number of SRS resources which can be configured to the UE for simultaneous transmission in the same symbol and the maximum number of SRS resources are UE capabilities. In one example, only one SRS port for each SRS resource is configured. In one example, only one SRS resource set can be configured with higher layer parameter usage in SRS-ResourceSet set to 'nonCodebook'. In one example, the maximum number of SRS resources that can be configured for non-codebook based uplink transmission is 4. The indicated SRI in slot n is associated with the most recent transmission of SRS resource(s) identified by the SRI, where the SRS transmission is prior to the PDCCH carrying the SRI.

For non-codebook based transmission, the UE can calculate the precoder used for the transmission of SRS based on measurement of an associated NZP CSI-RS resource. A UE can be configured with only one NZP CSI-RS resource for the SRS resource set with higher layer parameter usage in SRS-ResourceSet set to 'nonCodebook' if configured.

If aperiodic SRS resource set is configured, the associated NZP-CSI-RS is indicated via SRS request field in DCI format 0_1 and 1_1, where AperiodicSRS-Resource Trigger (indicating the association between aperiodic SRS triggering state and SRS resource sets), triggered SRS resource(s) srs-ResourceSetId, csi-RS (indicating the associated NZP-CSI-RS-ResourceId) are higher layer configured in SRS-ResourceSet. A UE is not expected to update the SRS precoding information if the gap from the last symbol of the reception of the aperiodic NZP-CSI-RS resource and the first symbol of the aperiodic SRS transmission is less than 42 OFDM symbols.

If the UE is configured with aperiodic SRS associated with aperiodic NZP CSI-RS resource, the presence of the associated CSI-RS is indicated by the SRS request field if the value of the SRS request field is not '00' and if the scheduling DCI is not used for cross carrier or cross bandwidth part scheduling. The CSI-RS is located in the same slot as the SRS request field. If the UE configured with aperiodic SRS associated with aperiodic NZP CSI-RS resource, any of the TCI states configured in the scheduled CC shall not be configured with 'QCL-TypeD'.

In the following embodiments on this component, we assume that the UE is configured with a SRS resource set, and associatedCSI-RS in SRS-ResourceSet for the SRS resource set for non-codebook based UL transmission, the details of which are as explained above. We further assume that SRS resource(s) in the SRS resource set are configured to be aperiodic.

In one embodiment 5A, the PDCCH containing the DCI triggers AP-SRS where the AP-SRS is associated with an AP-CSI-RS (e.g., AP-CSI-RS can be received by the UE to obtain beamforming/precoding information for pre-coded AP-SRS transmission). In one example, AP-CSI-RS is associated with an AP-SRS via higher layer configuration (this is pertinent when DL-UL beam correspondence or reciprocity holds). At least one of embodiments 1-3, or sub-embodiments therein, can be used (analogously) for aperiodic CSI-RS transmission in this case. The DCI triggering aperiodic CSI-RS can be DL-related DCI or UL-related DCI.

Let $\mu_{PDCCH}$, $\mu_{CSI-RS}$, and $\mu_{SRS}$, respectively, be the subcarrier spacing configurations for PDCCH, CSI-RS, and SRS. In the following embodiment, the subcarrier spacing configurations for PDCCH and CSI-RS are the same, i.e., $\mu_{PDCCH}=\mu_{CSI-RS}$, and that for SRS can be different from PDCCH/CSI-RS.

In one embodiment 5B, the PDCCH containing the DCI triggers AP-SRS where the AP-SRS is associated with an AP-CSI-RS (e.g., AP-CSI-RS can be received by the UE to obtain beamforming/precoding information for pre-coded AP-SRS transmission). In one example, AP-CSI-RS is associated with an AP-SRS via higher layer configuration (this is pertinent when DL-UL beam correspondence or reciprocity holds).

Regarding the QCL assumption for SRS transmission, the UE is not expected to be configured with 'QCL-Type D' which indicates spatial filtering information (the spatial filtering information is instead derived based on AP-CSI-RS associated with the AP-SRS).

Since CSI-RS is located in the same slot as PDCCH, the slot offset between PDCCH and CSI-RS is zero.

The minimal time interval between the last symbol of the PDCCH triggering the aperiodic SRS transmission and the first symbol of SRS resource is determined according to at least one example/alternative in embodiment 4A.

The slot offset between PDCCH and SRS transmission is determined according to at least one example/alternative in embodiment 4A.

The processing time between AP-CSI-RS reception and AP-SRS transmission needs to be such that the UE can derive/calculate the updated SRS precoding information after AP-CSI-RS reception. At least one of the following examples is used for the processing time.

In one example 5B-1, a UE is not expected to update the SRS precoding information if the gap from the last symbol of the reception of the aperiodic NZP-CSI-RS resource and the first symbol of the aperiodic SRS transmission is less than Z OFDM symbols. In one alternative, Z is fixed (e.g., 42). In another alternative, Z is configured to the UE.

In one example 5B-2, a UE is not expected to update the SRS precoding information if the gap from the last symbol of the reception of the aperiodic NZP-CSI-RS resource and the first symbol of the aperiodic SRS transmission is less than Z OFDM symbols, where the OFDM symbols is counted based on the minimum subcarrier spacing between the PDCCH (or AP-CSI-RS) and the AP-SRS. In one alternative, Z is fixed (e.g., 42). In another alternative, Z is configured to the UE.

In one example 5B-3, a UE is not expected to update the SRS precoding information if the gap from the last symbol of the reception of the aperiodic NZP-CSI-RS resource and the first symbol of the aperiodic SRS transmission is less than 42×q OFDM symbols, where the parameter q is determined according to at least one of the following examples. Note here that $\mu_{PDCCH}=\mu_{CSI-RS}$.

In one example, $$q = \frac{2^{\mu_{SRS}}}{2^{\mu_{PDCCH}}} \text{ or}$$

$$\left\lceil \frac{2^{\mu_{SRS}}}{2^{\mu_{PDCCH}}} \right\rceil \text{ or}$$

-continued $$\left\lfloor \frac{2^{\mu_{SRS}}}{2^{\mu_{PDCCH}}} \right\rfloor \text{ or}$$

$$\left\lceil \frac{2^{\mu_{SRS}}}{2^{\mu_{PDCCH}}} \right\rceil \text{ or}$$

$$\left\lfloor \frac{2^{\mu_{SRS}}}{2^{\mu_{PDCCH}}} \right\rfloor.$$

In another example, $q=(2^{\mu_{SRS}-\mu_{PDCCH}})$ or $q=\lceil 2^{\mu_{SRS}-\mu_{PDCCH}} \rceil$ or $q=\lfloor 2^{\mu_{SRS}-\mu_{PDCCH}} \rfloor$.

In another example, $$q = \max\left(1, \frac{2^{\mu_{SRS}}}{2^{\mu_{PDCCH}}}\right) = 2^{\max(0, \mu_{SRS}-\mu_{PDCCH})}.$$

In one example 5B-4, a UE is not expected to update the SRS precoding information if the gap from the last symbol of the reception of the aperiodic NZP-CSI-RS resource and the first symbol of the aperiodic SRS transmission is less than Z×q OFDM symbols, where the parameter q is determined according to at least one of the following examples in example 5B-3, and Z is either fixed (e.g., 14, 28, 42, or 48), or configured to the UE.

In 3GPP NR specification, the UL transmission is configured to be either codebook-based or non-codebook-based via higher layer parameter txConfig in PUSCH-Config set to either "codebook" or "nonCodebook."

According to 3GPP NR specification, the following is supported for codebook based UL transmission. For codebook based transmission, the UE determines the UE's codebook subsets based on TPMI and upon the reception of higher layer parameter ULCodebookSubset or codebookSubset in PUSCH-Config which may be configured with "fullAndPartialAndNonCoherent," or "partialAndNonCoherent," or "nonCoherent" depending on the UE capability. The maximum transmission rank may be configured by the higher parameter ULmaxRank or maxRank in PUSCH-Config.

A UE reporting the UE's UE capability of "partialAndNonCoherent" transmission may not expect to be configured by ULCodebookSubset with "fullAndPartialAndNonCoherent."

A UE reporting the UE's UE capability of "Non-Coherent" transmission may not expect to be configured by ULCodebookSubset with "fullAndPartialAndNonCoherent" or with "partialAndNonCoherent."

A UE may not expect to be configured with the higher layer parameter ULCodebookSubset set to "partialAndNonCoherent" when two antenna ports are configured.

In the present disclosure, "fullAndPartialAndNonCoherent," "partialAndNonCoherent," and "Non-Coherent" are referred to as the three examples of coherence type/capability, where the term "coherence" implies a subset of antenna ports at the UE that can be used to transmit a layer of UL data coherently.

According to NR specification, for non-codebook-based UL transmission, the precoding matrix W equals the identity matrix. For codebook-based UL transmission, the precoding matrix W is given by W=1 for single-layer transmission on a single antenna port, otherwise by TABLE 3 to TABLE 8.

The subset of TPMI indices for the three coherence types are summarized in TABLE 9 and TABLE 10 where rank=r corresponds to (and is equivalent to) r layers.

The rank (or number of layers) and the corresponding precoding matrix W are indicated to the UE using TRI and TPMI, respectively. In one example, this indication is joint via a field "Precoding information and number of layers" in DCI, e.g., using DCI format 0_1. In another example, this indication is via higher layer RRC signaling. In one example, the mapping between a field "Precoding information and number of layers" and TRI/TPMI is according to NR.

The rank (or number of layers) and the corresponding precoding matrix W are indicated to the UE using TRI and TPMI, respectively. In one example, this indication is joint via a field "Precoding information and number of layers" in DCI, e.g., using DCI format 0-1. In another example, this indication is via higher layer RRC signaling. In one example, the mapping between a field "Precoding information and number of layers" and TRI/TPMI is according to NR.

TABLE 3

Precoding matrix W for single-layer transmission using two antenna ports

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 4

Precoding matrix W for single-layer transmission using four antenna ports with transform precoding disabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |

TABLE 4-continued

Precoding matrix W for single-layer transmission using four antenna ports with transform precoding disabled.

| TPMI index | W (ordered from left to right in increasing order of TPMI index) |
|---|---|
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 5

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

TABLE 6

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |

TABLE 6-continued

Precoding matrix W for two-layer transmission using four antenna ports with transform precoding disabled.

| TPMI index | W (ordered from left to right in increasing order of TPMI index) | | | |
|---|---|---|---|---|
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE 7

Precoding matrix W for three-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 8

Precoding matrix W for four-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

TABLE 9

TPMI indices for 2 antenna ports

| Rank | Non-Coherent | fullAndPartialAndNonCoherent |
|---|---|---|
| 1 | 0-1 | 0-5 |
| 2 | 0 | 0-2 |

TABLE 10

TPMI indices for 4 antenna ports

| Rank | Non-Coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

In one embodiment 6A1, a UE is configured with a low-resolution dual-stage codebook $C_1$ for codebook-based UL transmission where the codebook $C_1$ comprises precoding matrices W=W1W2, where
  the first component W1 is a group of L pre-coders/beams/ports, and
  the second component W2 is a selection vector which selects 1 pre-coder/beam/port (from the L pre-coders/beams/ports in W1) per layer, and if UE antennas are dual-polarized, then it may also select a co-phase value.
An example of such a codebook is NR Type I CSI codebook.

In one embodiment 6A2, a UE is configured with a high-resolution dual-stage codebook $C_2$ for codebook-based UL transmission where the codebook $C_2$ comprises precoding matrices W=W1W2, where
  the first component W1 comprises a group of L pre-coders/beams/ports, and
  the second component W2 is a combination vector which combines L pre-coders/beams/ports (in W1) per layer.
An example of such a codebook is NR Type II CSI codebook. Another example of such as codebook is that W1 is (potentially oversampled) DFT codebook and W2 is NR UL codebook (either all or a subset of pre-coder/pre-coding matrices).

If both W1 and W2 are indicated by the gNB to the UE, then at least one of the following alternatives is used for the indication.
  In one alternative Alt 6A-1: A joint TPMI indicates both W1 and W2.
  In one alternative Alt 6A-2: A joint SRI indicates both W1 and W2. If number of SRS resources>1, then the selected SRS resource(s) is (are) also indicated jointly with SRI.
  In one alternative Alt 6A-3: A joint SRI2 indicates both W1 and W2. If number of SRS resources>1, then the selected SRS resource(s) is (are) indicated via a separate SRI indication.
  In one alternative Alt 6A-4: A first TPMI1 indicates W1, and a second TPMI2 indicates W2.
  In one alternative Alt 6A-5: TPMI indicates W1, and SRI indicates W2. If number of SRS resources>1, then the selected SRS resource(s) is (are) also indicated jointly with SRI.
  In one alternative Alt 6A-6: TPMI indicates W1, and SRI2 indicates W2. If number of SRS resources>1, then the selected SRS resource(s) is (are) indicated via a separate SRI indication.
  In one alternative Alt 6A-7: TPMI indicates W2, and SRI indicates W1. If number of SRS resources>1, then the selected SRS resource(s) is (are) also indicated jointly with SRI.
  In one alternative Alt 6A-8: TPMI indicates W2, and SRI2 indicates W1. If number of SRS resources>1, then the selected SRS resource(s) is (are) indicated via a separate SRI indication.
  In one alternative Alt 6A-9: A first SRI1 indicates W1, and a second SRI2 indicates W2. If number of SRS resources>1, then the selected SRS resource(s) is (are) also indicated jointly either with SRI1 or SRI2.
  In one alternative Alt 6A-10: A first SRI1 indicates W1, and a second SRI2 indicates W2. If number of SRS resources>1, then the selected SRS resource(s) is (are) indicated via a separate SRI indication.

If only W1 is indicated by the gNB to the UE (e.g. when W2 is determined by the UE in a transparent manner), then at least one of the following alternative is used for the indication.
  In one alternative Alt 6A-11: TPMI indicates W1.
  In one alternative Alt 6A-12: SRI indicates W. If number of SRS resources>1, then the selected SRS resource(s) is (are) also indicated jointly with SRI.
  In one alternative Alt 6A-13: SRI2 indicates W1. If number of SRS resources>1, then the selected SRS resource(s) is (are) indicated via a separate SRI indication.

If only W2 is indicated by the gNB to the UE (e.g. when W1 is determined by the UE in a transparent manner), then at least one of the following alternative is used for the indication.
  In one alternative Alt 6A-14: TPMI indicates W2.
  In one alternative Alt 6A-15: SRI indicates W2. If number of SRS resources>1, then the selected SRS resource(s) is (are) also indicated jointly with SRI.
  In one alternative Alt 6A-16: SRI2 indicates W2. If number of SRS resources>1, then the selected SRS resource(s) is (are) indicated via a separate SRI indication.

The W1 indication is in a WB manner, i.e., a single W1 is indicated common for all scheduled PRBs/SBs for UL transmission. The W2 indication, on the other hand, can either be in a WB manner or per SB, i.e., one W2 is indication for each scheduled PRB/SB.

The W1 indication can be via UL-related DCI (e.g., DCI format 0_1 in NR). Alternatively, it is via higher-layer (e.g., RRC) signaling.

Alternatively, the W1 indication is via PDSCH. Likewise, the W2 indication can be via UL-related DCI (e.g., DCI format 0_1 in NR). Alternatively, the W2 indication is via higher-layer (e.g., RRC) signaling. Alternatively, the W2 indication is via PDSCH.

In one alternative, the value L in UL codebooks ($C_1$ and $C_2$) is fixed, for example, L=1 for $C_1$ and L=2 for $C_2$. In another alternative, the value L in UL codebooks ($C_1$ and $C_2$) is configured (e.g. via higher layer RRC signaling), for example, from $\{1, 2\}$.

In one example, when L=1 for $C_1$, the UL codebook is the same as NR Type I codebook for Codebook-Config 1.

In one example, when L=2 for $C_2$, the UL codebook is the same as Rel. 15 Type II codebook, except that there can be some additional restrictions such as either one or any combination of the following restrictions.

- The W2 comprises only coefficient phase, where the phase codebook is fixed to QPSK (2 bits per coefficient). The coefficient amplitude is assumed to be one.
- The W2 comprises only coefficient phase, where the phase codebook is configurable from QPSK (2 bits) and 8PSK (3 bits). The coefficient amplitude is assumed to be one.
- The W2 comprises coefficient phase and coefficient amplitude, where the phase codebook is fixed to QPSK (2 bits per coefficient) and the coefficient amplitude is fixed to $$\left\{0, \frac{1}{2}, \frac{1}{\sqrt{2}}, 1\right\} (2 \text{ bits}).$$

- The W2 comprises coefficient phase and coefficient amplitude, where the phase codebook is configurable from QPSK (2 bits) and 8PSK (3 bits) and the coefficient amplitude is fixed to $$\left\{0, \frac{1}{2}, \frac{1}{\sqrt{2}}, 1\right\} (2 \text{ bits}).$$

- The W2 comprises coefficient phase and coefficient amplitude, where the phase codebook is fixed to QPSK (2 bits per coefficient) and the coefficient amplitude is fixed to WB amplitude codebook in Rel. 15 Type II codebook.
- The W2 comprises coefficient phase and coefficient amplitude, where the phase codebook is configurable from QPSK (2 bits) and 8PSK (3 bits) and the coefficient amplitude is fixed to WB amplitude codebook in Rel.15 Type II codebook.
- Only rank 1 is supported.

Figure 11:
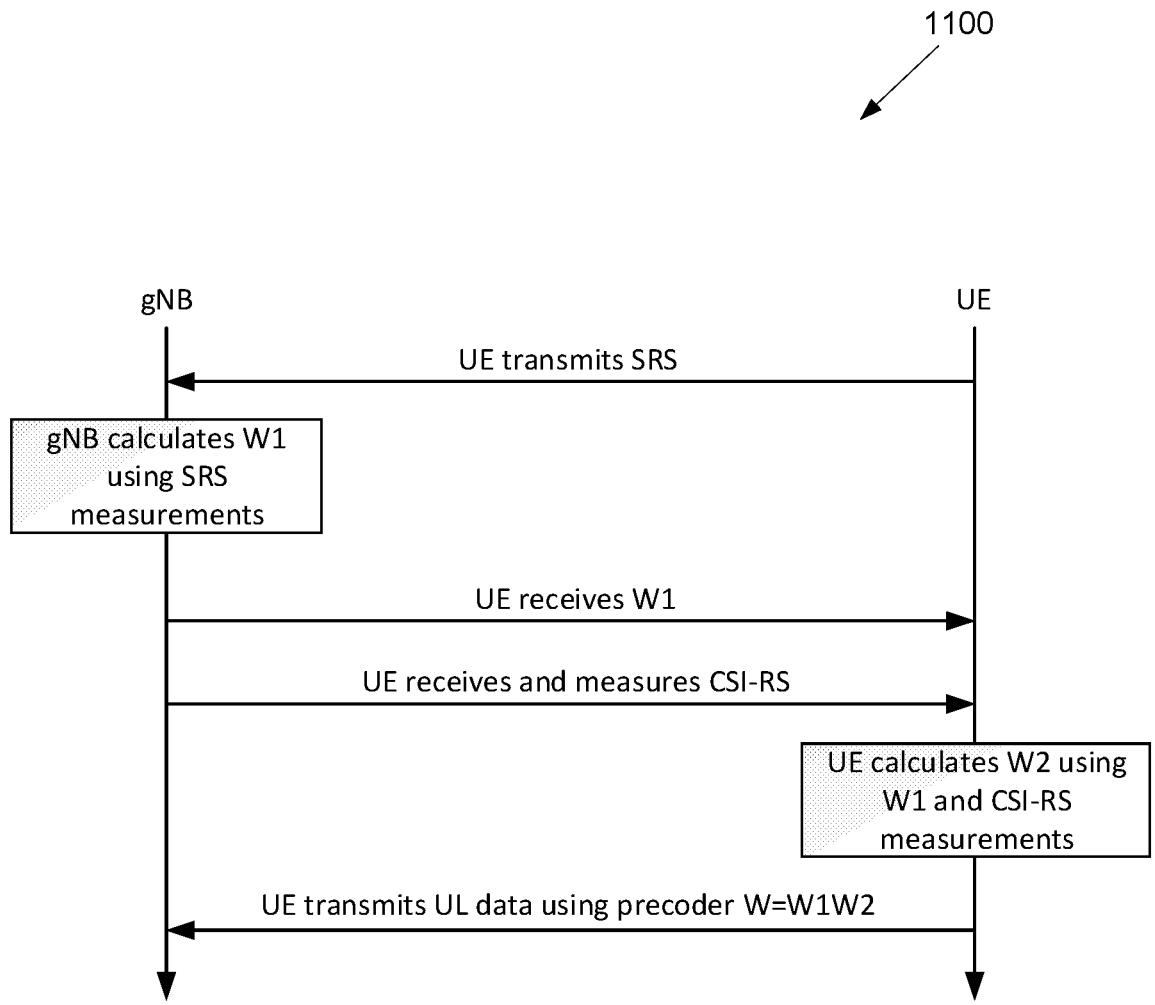
FIG. 11 illustrates a method for a partial reciprocity based uplink transmission scheme according to embodiments of the present disclosure.

FIG. 11 illustrates a method for a partial reciprocity based scheme 1100 according to embodiments of the present disclosure. The embodiment of the partial reciprocity based scheme 1100 illustrated in FIG. 11 is for illustration only. FIG. 11 does not limit the scope of this disclosure to any particular implementation of the partial reciprocity based scheme 1100.

In one embodiment 7, a UE is configured with codebook-based UL transmission according to the method illustrated in FIG. 11. As illustrated in FIG. 11, The UE receives higher-layer configuration to transmit $N_{SRS} \geq 1$ SRS resources. In response, the UE transmits SRS resources according to the configuration. The gNB measures these SRS resources, estimates UL channel based on the SRS measurement, and then determines/calculates W1 (indicating a group of pre-coders/beams). The UE receives an indication about W1 (from the gNB). The UE next receives a configuration about CSI-RS measurement (for W2 calculation). The UE receives/measures CSI-RS, estimates DL channel, and (assuming reciprocity) uses it as UL channel for W2 calculation. The UE finally transmits UL transmission using pre-coder/pre-coding matrix W=W1W2, where W1 is indicated by the gNB, and W2 is determined by the UE. Since W2 is transparent to the gNB/NW, the UE can calculate W2 for each scheduled PRB/SB for UL transmission, i.e., the UL precoding can be applied in a per PRB/SB manner.

Since W1 is a WB component of the pre-coding matrix W, it can be indicated via higher layer (e.g. RRC) signaling. Alternatively, W1 is indicated via UL-related DCI (e.g. DCI format 0_1 in NR). Also, W1 indication can be via a separate UL-related DCI parameter. Or, this indication can be via an existing UL-related DCI parameter such as TPMI or SRI.

The W1 indication can correspond to a fixed rank (transmit rank indicator or TRI) value, for example, rank 1. Or, a rank (TRI) value is also indicated jointly with the W indication. Or, a rank (TRI) value is also indicated separately from the W1 indication. In the latter case, at least one of the following indication alternatives can be used.

- In one alternative Alt 7-1: W1 indication is via higher-layer signaling and TRI indication is via DCI. Their respective indication is either joint using an existing parameter or separate using a new parameter.
- In one alternative Alt 7-2: W1 indication is via DCI and TRI indication is via higher-layer signaling. Their respective indication is either joint using an existing parameter or separate using a new parameter.
- In one alternative Alt 7-3: Both W1 and TRI indication are via DCI, either jointly using a single parameter or separately using two parameters.
- In one alternative Alt 7-4: Both W1 and TRI indication are via higher-layer signaling, either jointly using a single parameter or separately using two parameters.

The W2 calculation at the UE either follows rank indicated via TRI or has a fixed rank (e.g. rank 1). In an alternative, TRI is indicated via higher layer signaling, and W1 and W2 are calculated/indicated accordingly.

The other UL-related parameters such as MCS can be indicated jointly with the W1 indication. Or, they are indicated via a separate indication (e.g., via DCI).

The SRS and CSI-RS resources can be linked (or associated with each other) via higher layer configuration of parameters such as associatedSRS in CSI-RS-ResourceSet for CSI-RS resource and associatedCSI-RS in SRS-ResourceSet for SRS resource.

Figure 12:
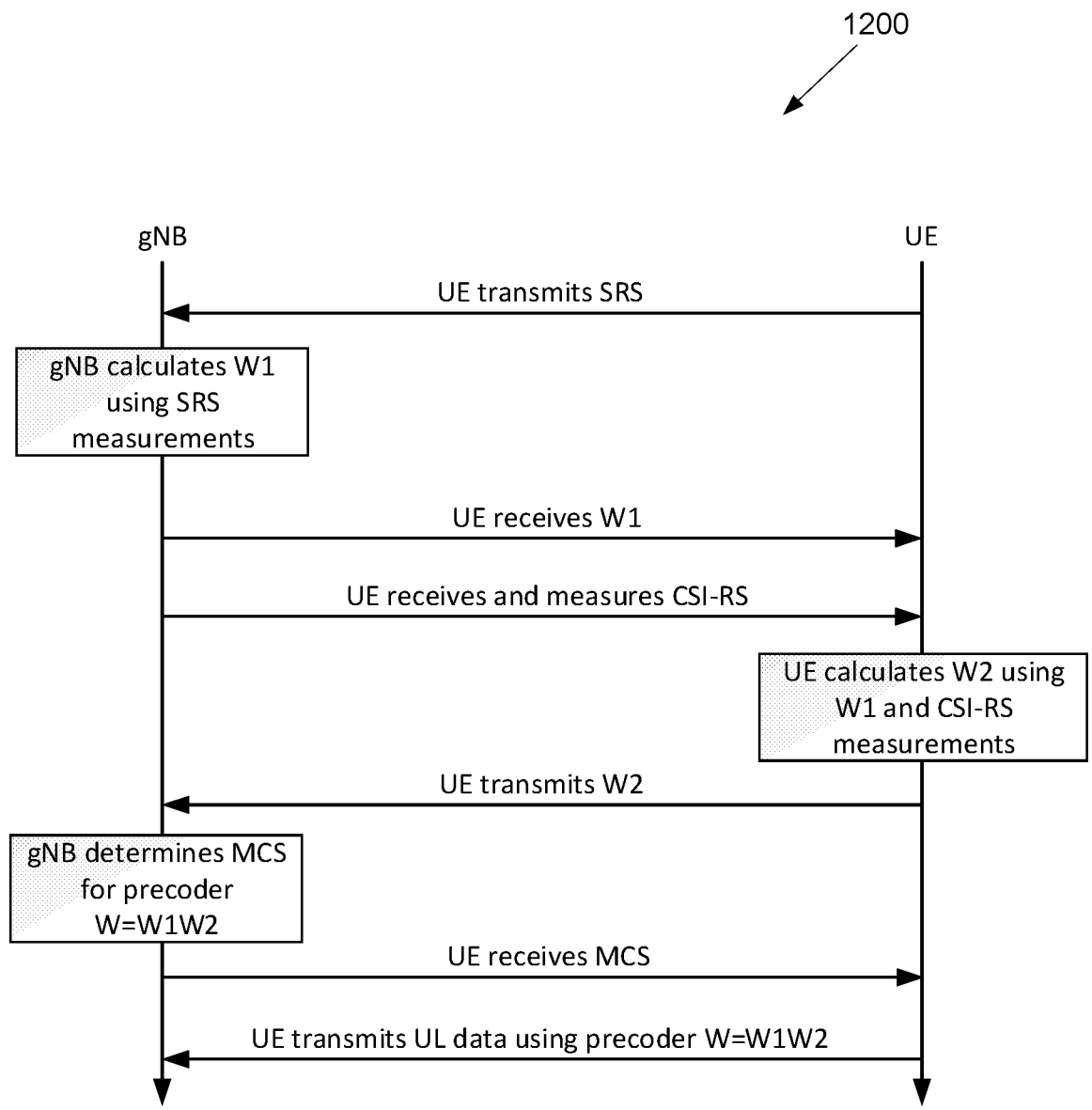
FIG. 12 illustrates another method for a partial reciprocity based uplink transmission scheme according to embodiments of the present disclosure.

FIG. 12 illustrates another method for a partial reciprocity based scheme 1200 according to embodiments of the present disclosure. The embodiment of the partial reciprocity based scheme 1200 illustrated in FIG. 12 is for illustration only. FIG. 12 does not limit the scope of this disclosure to any particular implementation of the partial reciprocity based scheme 1200.

In one embodiment 7A, as illustrated in FIG. 12, which is a variation of embodiment 7, the UE is further configured to transmit W2 to the gNB which uses it to determine parameters such as MCS for UL transmission assuming W=W1W2 as UL pre-coder/pre-coding matrix. The UE receives MCS (e.g., via UL-related DCI) and transmits UL data accordingly.

Figure 13:
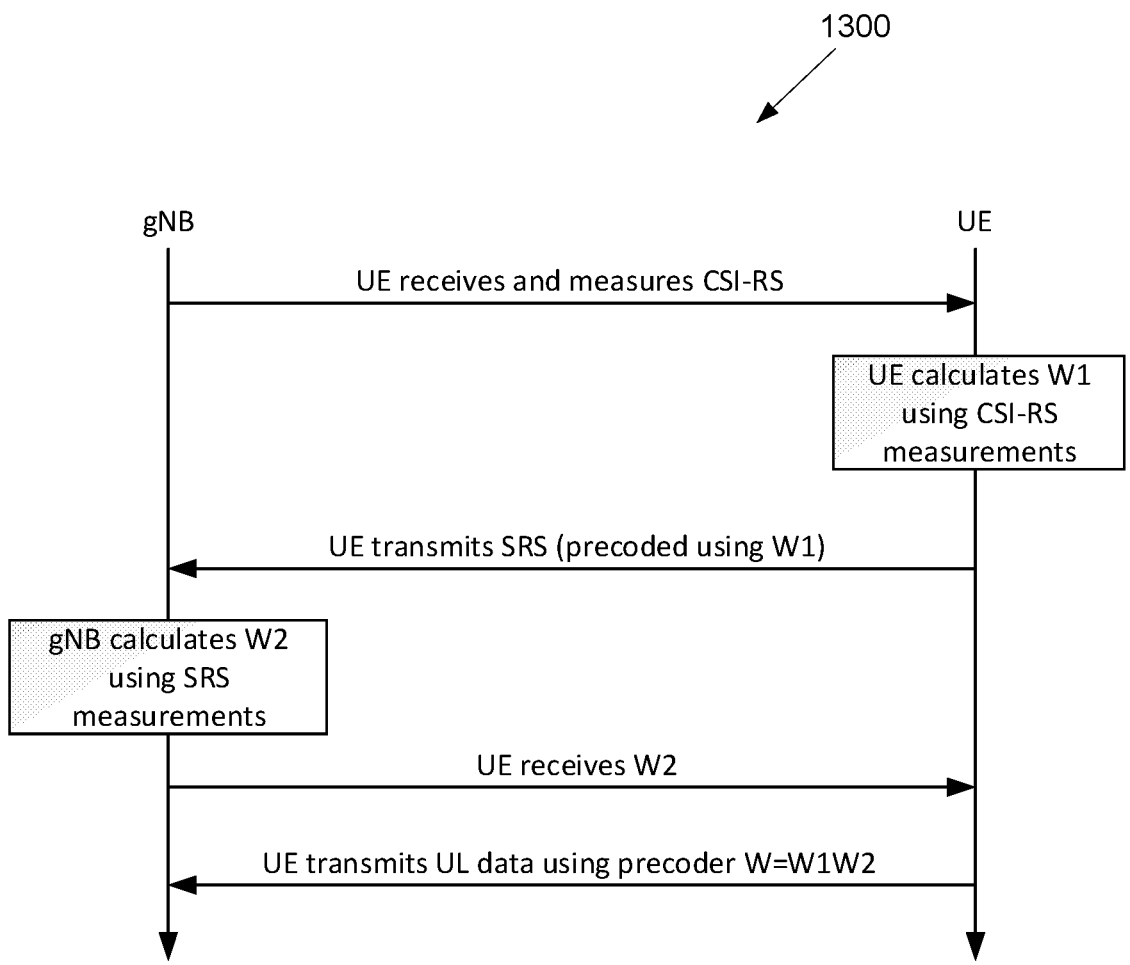
FIG. 13 illustrates yet another method for a partial reciprocity based uplink transmission scheme according to embodiments of the present disclosure.

FIG. 13 illustrates yet another method for a partial reciprocity based scheme 1300 according to embodiments of the present disclosure. The embodiment of the partial reciprocity based scheme 1300 illustrated in FIG. 13 is for illustration only. FIG. 13 does not limit the scope of this disclosure to any particular implementation of the partial reciprocity based scheme 1300.

In one embodiment 8, as illustrated in FIG. 13, a UE is configured with codebook-based UL transmission. The UE receives a configuration (e.g., via higher layer signaling) about CSI-RS measurement (for W1 calculation). The UE receives/measures CSI-RS, estimates DL channel, and (assuming reciprocity) uses it as UL channel for W1 calculation. The calculated W1 is used to pre-code $N_{SRS} \geq 1$ SRS resources, whose configuration is received by the UE via higher layer signaling, either jointly with or separate from CSI-RS configuration. The UE transmits SRS resources (pre-coded with W1) according to the configuration. The gNB measures these SRS resources, estimates UL channel based on the SRS measurement, and then determines/calculates W2 component of the UL pre-coder. The UE receives an indication about W2 (from the gNB). The UE finally transmits UL transmission using pre-coder/pre-coding matrix W=W1W2, where W2 is indicated by the gNB (hence, it is non-transparent), and W1 is determined by the UE (hence, it is transparent).

The W2 indication can be WB, i.e., a single W2 is indicated for all scheduled PRBs/SBs for UL transmission. Alternatively, the gNB/NW can calculate W2 for each scheduled PRB/SB for UL transmission, i.e., the UL pre-coding can be applied in a per PRB/SB manner.

The use of multiple pre-coded SRS resources (that are pre-coded using W1 derived based on CSI-RS measurement) can, for instance, be for capturing UL channel rank space or avoiding UL channel null space.

Let X=number of precoders/beams in W1.

In one sub-embodiment 8-1, $N_{SRS}$=X, and each SRS resource comprises 1 port. The W2 indicates a pre-coder which combines all X SRS ports (equivalently, all precoders/beams in W1) for each layer using the W2 of high-resolution codebook $C_2$ in embodiment A2.

In one sub-embodiment 8-2, $N_{SRS}$=1, and the SRS resource comprises X port. The W2 indicates a pre-coder which combines all X SRS ports (equivalently, all precoders/beams in W1) for each layer using the W2 of high-resolution codebook $C_2$ in embodiment A2.

In one sub-embodiment 8-3, $N_{SRS}$=Y, and each SRS resource comprises X/Y ports. The W2 indicates a pre-coder which combines all X SRS ports (equivalently, all precoders/beams in W1) for each layer using the W2 of high-resolution codebook $C_2$ in embodiment A2.

In one sub-embodiment 8-4, $N_{SRS}$=X, and each SRS resource comprises 1 port. The W2 indicates a pre-coder which selects 1 out of X SRS ports (equivalently, 1 precoder/beam in W1) for each layer using the W2 of low-resolution codebook $C_1$ in embodiment A1.

In one sub-embodiment 8-5, $N_{SRS}$=1, and the SRS resource comprises X port. The W2 indicates a pre-coder which selects 1 out of X SRS ports (equivalently, 1 precoder/beam in W1) for each layer using the W2 of low-resolution codebook $C_1$ in embodiment A1.

In one sub-embodiment 8-6, $N_{SRS}$=Y, and each SRS resource comprises X/Y ports. The W2 indicates a pre-coder which selects 1 out of X SRS ports (equivalently, 1 precoder/beam in W1) for each layer using the W2 of low-resolution codebook $C_1$ in embodiment A1.

The W2 indication is according to one of Alt 6A-14, 6A-15, and 6A-16. Alternatively, a generalized (joint) SRI can be used to indicate both SRS resource selection and W2 for the selected SRS resources. That is, this generalized SRI essentially functions as a TPMI across the selected SRS resources. Alternatively, generalized (joint) TPMI can be used to indicate both SRS resource selection and W2 for the selected SRS resources. That is, this generalized TPMI essentially functions as a TPMI across the selected SRS resources. Alternatively, a SRI can be used to indicate SRS resource selection, and TPMI can be used to indicate W2 for the selected SRS resources.

The W2 indication can correspond to a fixed rank (transmit rank indicator or TRI) value, for example, rank 1. Or, a rank (TRI) value is also indicated jointly with the W2 indication. Or, a rank (TRI) value is also indicated separately from the W2 indication. In the latter case, at least one of the following indication alternatives can be used.

In one alternative Alt 8-1: W2 indication is via higher-layer signaling and TRI indication is via DCI. Their respective indication is either joint using an existing parameter or separate using a new parameter.

In one alternative Alt 8-2: W2 indication is via DCI and TRI indication is via higher-layer signaling. Their respective indication is either joint using an existing parameter or separate using a new parameter.

In one alternative Alt 8-3: Both W2 and TRI indication are via DCI, either jointly using a single parameter or separately using two parameters.

In one alternative Alt 8-4: Both W2 and TRI indication are via higher-layer signaling, either jointly using a single parameter or separately using two parameters.

The W1 calculation at the UE has a fixed rank (e.g., rank 1). In an alternative, TRI is indicated via higher layer signaling, and W and W2 are calculated/indicated accordingly.

The SRS and CSI-RS resources can be linked (or associated with each other) via higher layer configuration of parameters such as associatedSRS in CSI-RS-ResourceSet for CSI-RS resource and associatedCSI-RS in SRS-ResourceSet for SRS resource.

In one embodiment 8A, a variation of embodiment 8, the UE is configured to transmit W1 to the gNB and SRS resources (that are not pre-coded with W1), which uses them to determine parameters such as MCS for UL transmission assuming W=W1W2 as UL pre-coder/pre-coding matrix. The UE receives MCS (e.g. via UL-related DCI) and transmits UL data accordingly.

Figure 14:
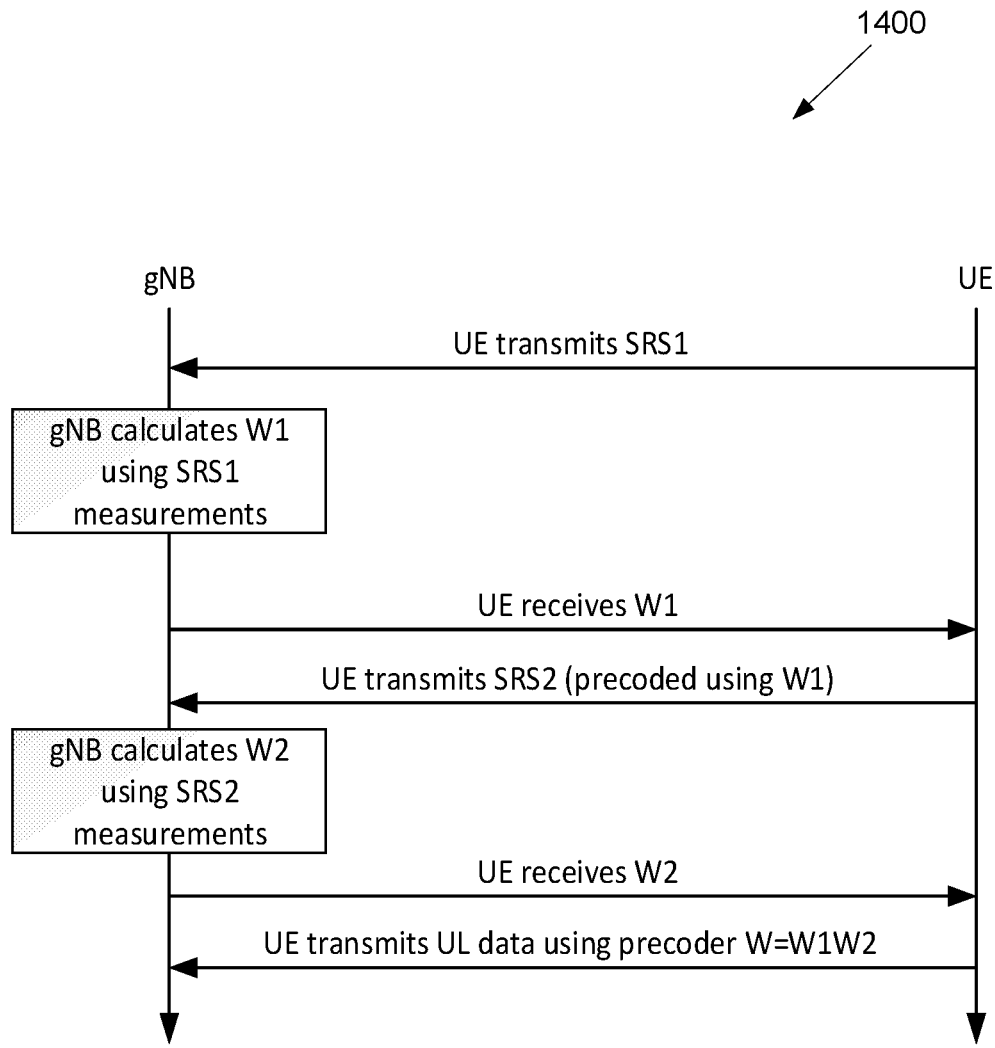
FIG. 14 illustrates still another method for a partial reciprocity based uplink transmission scheme according to embodiments of the present disclosure.

FIG. 14 illustrates still another method for a partial reciprocity based scheme 1400 according to embodiments of the present disclosure. The embodiment of the partial reciprocity based scheme 1400 illustrated in FIG. 14 is for illustration only. FIG. 14 does not limit the scope of this disclosure to any particular implementation of the partial reciprocity based scheme 1400.

In one embodiment 9, as illustrated in FIG. 14, a UE is configured with codebook-based UL transmission. The UE receives higher-layer configuration for the first SRS transmission comprising $N_{SRS} \geq 1$ SRS resources. In response, the UE transmits the first SRS resources according to the configuration. The gNB measures these SRS resources, estimates UL channel based on the SRS measurement, and then determines/calculates W1 (indicating a group of precoders/beams). The UE receives an indication about W1 (from the gNB). The UE also receives higher-layer configuration for the second SRS transmission comprising $N_{SRS,2} \geq 1$ SRS resources, either jointly with or separate from the first SRS configuration. The UE transmits the second SRS resources (pre-coded with W1) according to the configuration. The gNB measures these SRS resources, estimates UL channel based on the SRS measurement, and then determines/calculates W2 component of the UL pre-coder. The UE receives an indication about W2 (from the gNB). The UE finally transmits UL transmission using pre-coder/pre-coding matrix W=W1W2.

The first SRS resources may or may not be pre-coded, but the second SRS resources are pre-coded based on W1 (e.g. via TPMI1). The rank (TRI) indication can be according to at least one of the following alternatives.

In one alternative Alt 9-1 (with W1): TRI is indicated either jointly or separately with the W1 indication (e.g. via TPMI1). The W2 indication either follows rank indicated via TRI or has a fixed rank (e.g. rank 1).

In one alternative Alt 9-2 (with W2): TRI is indicated either jointly or separately with the W2 indication (e.g. via TPMI2). The W1 indication can assume a fixed rank (e.g. rank 1).

In one alternative Alt 9-3 (with both W1 and W2): both TRI1 and TRI 2 are indicated.
TRI1 is indicated either jointly or separately with the W1 indication.
TRI2 is indicated either jointly or separately with the W2 indication.

Figure 15:
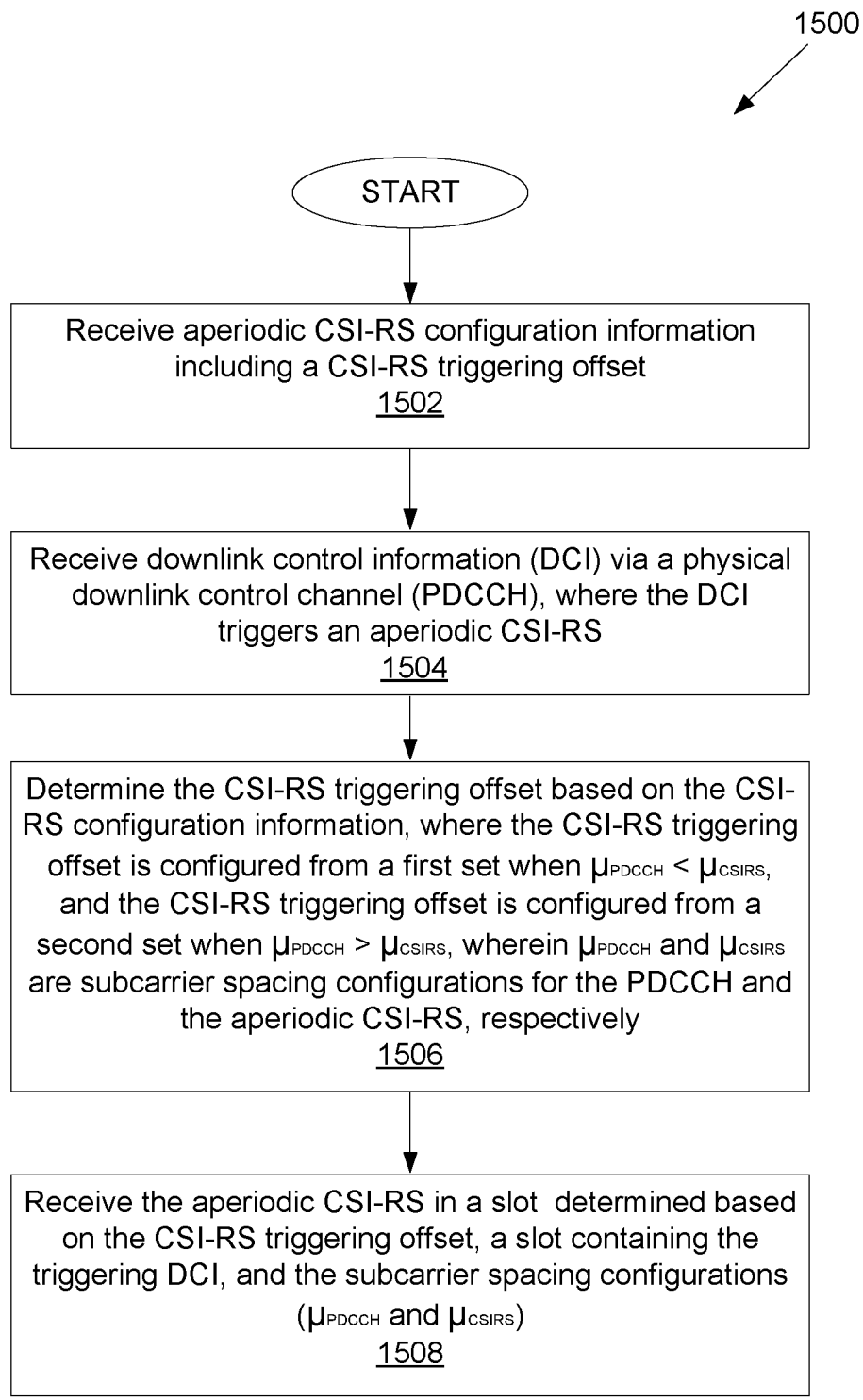
FIG. 15 illustrates a flow chart of a method for operating a user equipment (UE) for aperiodic channel state information reference signal (CSI-RS) reception, as may be performed by a UE according to embodiments of the present disclosure.

FIG. 15 illustrates a flow chart of a method 1500 for operating a user equipment (UE) for aperiodic channel state information reference signal (CSI-RS) reception, as may be performed by a UE such as UE 116, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the UE (e.g., 111-116 as illustrated in FIG. 1) receives aperiodic CSI-RS configuration information including a CSI-RS triggering offset.

In step 1504, the UE receives downlink control information (DCI) via a physical downlink control channel (PDCCH), where the DCI triggers an aperiodic CSI-RS.

In step 1506, the UE determines the CSI-RS triggering offset based on the CSI-RS configuration information. The CSI-RS triggering offset is configured from a first set when $\mu_{PDCCH} < \mu_{CSIRS}$, and the CSI-RS triggering offset is configured from a second set when $\mu_{PDCCH} \geq \mu_{CSIRS}$, wherein $\mu_{PDCCH}$ and $\mu_{CSIRS}$ are subcarrier spacing configurations for the PDCCH and the aperiodic CSI-RS, respectively.

In step 1508, the UE receives the aperiodic CSI-RS in a slot $K_s$ determined based on the CSI-RS triggering offset, a slot containing the triggering DCI, and the subcarrier spacing configurations ($\mu_{PDCCH}$ and $\mu_{CSIRS}$).

In one embodiment, the first set is {0, 1, 2, . . . 31} and the second set is {0, 1, 2, 3, 4, 16, 24}.

In one embodiment, the slot $$K_s = \left\lfloor n \cdot \frac{2^{\mu_{CSIRS}}}{2^{\mu_{PDCCH}}} \right\rfloor + X,$$

where n is the slot containing the triggering DCI, X is the CSI-RS triggering offset, and $\lfloor \square \rfloor$ is a floor function.

In one embodiment, the processor is further configured to determine a starting orthogonal frequency-division multiplexing (OFDM) symbol for the aperiodic CSI-RS reception, and the transceiver is further configured to start the aperiodic CSI-RS reception from the starting OFDM symbol. For $\mu_{PDCCH} < \mu_{CSIRS}$, the starting OFDM symbol is determined such that the CSI-RS reception starts no earlier than a first OFDM symbol of a CSI-RS slot that starts at least Δ PDCCH symbols after an end of the PDCCH triggering the aperiodic CSI-RS. For $\mu_{PDCCH} > \mu_{CSIRS}$, the starting OFDM symbol is determined such that the CSI-RS reception starts no earlier than at least Δ PDCCH symbols after the end of the PDCCH triggering the aperiodic CSI-RS.

In one embodiment, when $\mu_{PDCCH}=0$ indicating subcarrier spacing of 15 kHz, Δ=4.

In one embodiment, the processor is further configured to determine a quasi co-location (QCL) assumption for the aperiodic CSI-RS reception based on a condition on a scheduling offset δ between a last symbol of the PDCCH triggering the aperiodic CSI-RS and a first symbol of the aperiodic CSI-RS, where the condition is given by, when δ<α, the QCL assumption is a QCL assumption for a PDSCH, if the PDSCH is received in the same OFDM symbols as the aperiodic CSI-RS, and the QCL assumption is a QCL assumption for a PDCCH, otherwise, when δ≥α, the QCL assumption is indicated via the PDCCH triggering the aperiodic CSI-RS. The transceiver is further configured to apply the determined QCL assumption for the aperiodic CSI-RS reception, where a is a threshold and the QCL assumption corresponds to QCL-TypeD indicating a beam to receive the aperiodic CSI-RS.

In one embodiment, the threshold $$\alpha = Y + d \frac{2^{\mu_{CSIRS}}}{2^{\mu_{PDCCH}}},$$

wherein Y is a UE reported threshold beamSwitchTiming taken from a set that includes {14, 28, 48}, and wherein d is an additional delay such that d=0 when $\mu_{PDCCH} \geq \mu_{CSIRS}$ and d=m when $\mu_{PDCCH} < \mu_{CSIRS}$.

In one embodiment, when $\mu_{PDCCH}=0$ indicating a subcarrier spacing of 15 kHz, m=4; when $\mu_{PDCCH}=1$ indicating a subcarrier spacing of 30 kHz, m=4; and when $\mu_{PDCCH}=2$ indicating a subcarrier spacing of 60 kHz, m=8.

Figure 16:
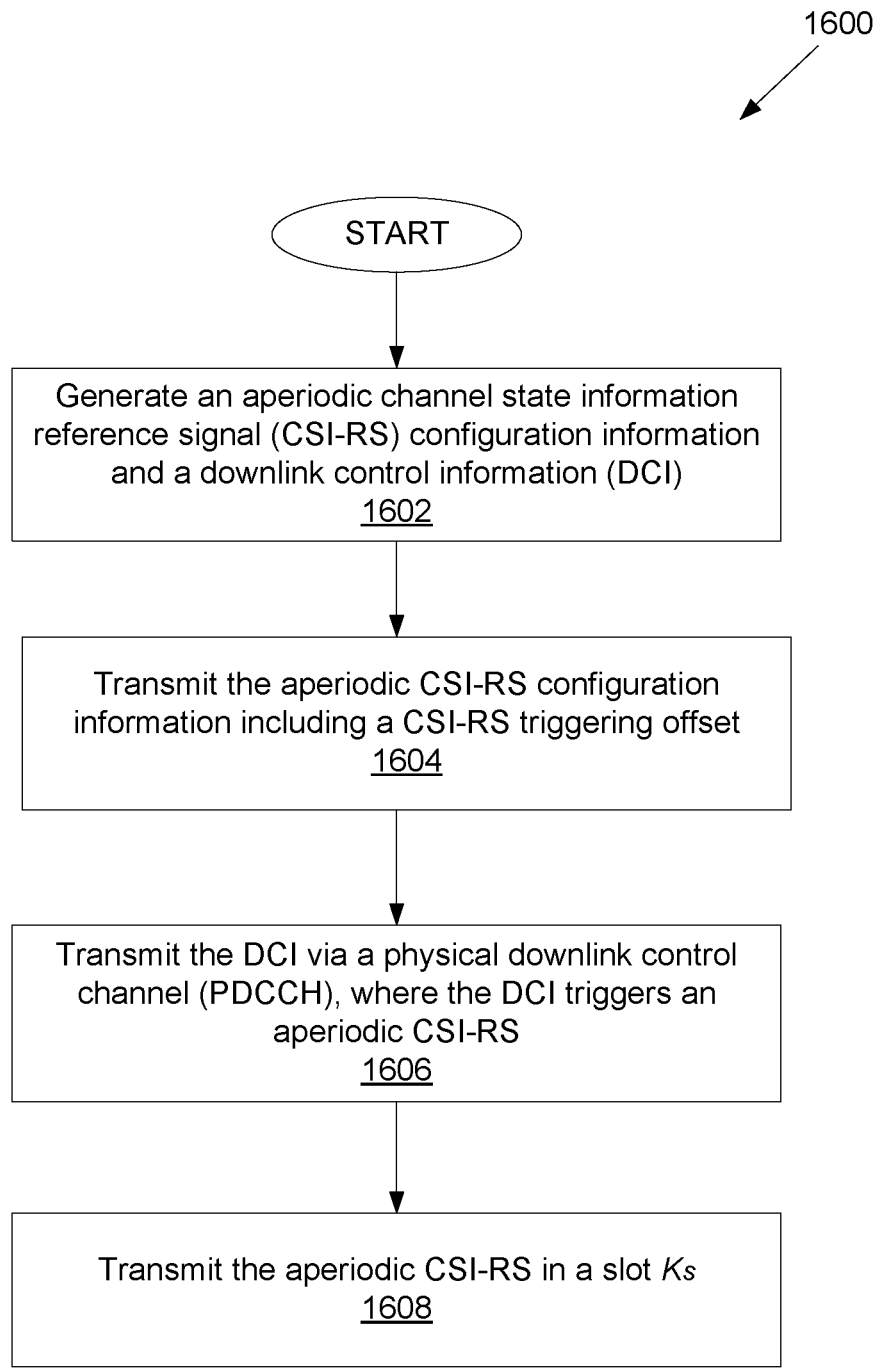
FIG. 16 illustrates a flow chart of another method for aperiodic channel state information reference signal (CSI-RS) transmission, as may be performed by a BS, according to embodiments of the present disclosure.

FIG. 16 illustrates a flow chart of another method 1600, as may be performed by a base station (BS) such as BS 102, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the BS (e.g., 101-103 as illustrated in FIG. 1), generates an aperiodic channel state information reference signal (CSI-RS) configuration information and a downlink control information (DCI).

In step 1604, the BS transmits the aperiodic CSI-RS configuration information including a CSI-RS triggering offset.

In step 1606, the BS transmits the DCI via a physical downlink control channel (PDCCH), where the DCI triggers an aperiodic CSI-RS.

In step 1608, the BS transmits the aperiodic CSI-RS in a slot $K_s$.

The CSI-RS triggering offset is configured from a first set when $\mu_{PDCCH} < \mu_{CSIRS}$, and from a second set when $\mu_{PDCCH} \geq \mu_{CSIRS}$, where $\mu_{PDCCH}$ and $\mu_{CSIRS}$ are subcarrier spacing configurations for the PDCCH and the aperiodic CSI-RS, respectively. The slot $K_s$ is determined based on the CSI-RS triggering offset, a slot containing the triggering DCI, and the subcarrier spacing configurations ($\mu_{PDCCH}$ and $\mu_{CSIRS}$).

In one embodiment, the first set is {0, 1, 2, . . . 31} and the second set is {0, 1, 2, 3, 4, 16, 24}.

In one embodiment, the slot $$K_s = \left\lfloor n \cdot \frac{2^{\mu_{CSIRS}}}{2^{\mu_{PDCCH}}} \right\rfloor + X,$$

where n is the slot containing the triggering DCI, X is the CSI-RS triggering offset, and $\lfloor \ \rfloor$ is a floor function.

In one embodiment, a starting orthogonal frequency-division multiplexing (OFDM) symbol for an aperiodic CSI-RS reception is determined based on the CSI-RS configuration information, and the aperiodic CSI-RS reception is started from the starting OFDM symbol. For $\mu_{PDCCH} < \mu_{CSIRS}$, the starting OFDM symbol is determined such that the CSI-RS reception starts no earlier than a first OFDM symbol of a CSI-RS slot that starts at least Δ PDCCH symbols after an end of the PDCCH triggering the aperiodic CSI-RS. For $\mu_{PDCCH} > \mu_{CSIRS}$, the starting OFDM symbol is determined such that the CSI-RS reception starts no earlier than at least Δ PDCCH symbols after the end of the PDCCH triggering the aperiodic CSI-RS.

In one embodiment, when $\mu_{PDCCH}$=0 indicating a subcarrier spacing of 15 kHz, Δ=4.

In one embodiment, a quasi co-location (QCL) assumption for aperiodic CSI-RS reception is determined based on a condition on a scheduling offset δ between a last symbol of the PDCCH triggering the aperiodic CSI-RS and a first symbol of the aperiodic CSI-RS, where the condition is given by, when δ<α, the QCL assumption is a QCL assumption for a PDSCH, if the PDSCH is received in the same OFDM symbols as the aperiodic CSI-RS, and the QCL assumption is a QCL assumption for a PDCCH, otherwise, when δ≥α, the QCL assumption is indicated via the PDCCH triggering the aperiodic CSI-RS; and the determined QCL assumption for the aperiodic CSI-RS reception is applied, where α is a threshold and the QCL assumption corresponds to QCL-TypeD indicating a beam to receive aperiodic CSI-RS.

In one embodiment, the threshold $$\alpha = Y + d \frac{2^{\mu_{CSIRS}}}{2^{\mu_{PDCCH}}},$$

wherein Y is a UE reported threshold beamSwitchTiming taken from a set that includes {14, 28, 48}, and wherein d is an additional delay such that d=0 when $\mu_{PDCCH} \geq \mu_{CSIRS}$ and d=m when $\mu_{PDCCH} < \mu_{CSIRS}$.

In one embodiment, when $\mu_{PDCCH}$=0 indicating a subcarrier spacing of 15 kHz, m=4; when $\mu_{PDCCH}$=1 indicating a subcarrier spacing of 30 kHz, m=4; and when $\mu_{PDCCH}$=2 indicating a subcarrier spacing of 60 kHz, m=8.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) for aperiodic channel state information reference signal (CSI-RS) reception, the UE comprising:
   a transceiver configured to:
      receive aperiodic CSI-RS configuration information including a CSI-RS triggering offset, and
      receive downlink control information (DCI) via a physical downlink control channel (PDCCH), wherein the DCI triggers the aperiodic CSI-RS; and
   a processor operably connected to the transceiver, the processor configured to determine the CSI-RS triggering offset based on the CSI-RS configuration information, wherein:
      the CSI-RS triggering offset is configured from a first set when $\mu_{PDCCH} < \mu_{CSIRS}$, and
      the CSI-RS triggering offset is configured from a second set when $\mu_{PDCCH} \geq \mu_{CSIRS}$,
   wherein $\mu_{PDCCH}$ and $\mu_{CSIRS}$ are subcarrier spacing configurations for the PDCCH and the aperiodic CSI-RS, respectively, and
   wherein the transceiver is further configured to receive the aperiodic CSI-RS in a slot $K_s$ determined based on the CSI-RS triggering offset, a slot containing the triggering DCI, and the subcarrier spacing configurations ($\mu_{PDCCH}$ and $\mu_{CSIRS}$).

2. The UE of claim 1, wherein the first set is {0, 1, 2, ... 31} and the second set is {0, 1, 2, 3, 4, 16, 24}.

3. The UE of claim 1, wherein the slot $$K_s = \left\lfloor n \cdot \frac{2^{\mu_{CSIRS}}}{2^{\mu_{PDCCH}}} \right\rfloor + X,$$

where n is the slot containing the triggering DCI, X is the CSI-RS triggering offset, and $\lfloor \ \rfloor$ is a floor function.

4. The UE of claim 1, wherein:
   the processor is further configured to determine a starting orthogonal frequency-division multiplexing (OFDM) symbol for the aperiodic CSI-RS reception; and
   the transceiver is further configured to start the aperiodic CSI-RS reception from the starting OFDM symbol, where
      for $\mu_{PDCCH} < \mu_{CSIRS}$, the starting OFDM symbol is determined such that the CSI-RS reception starts no earlier than a first OFDM symbol of a CSI-RS slot that starts at least Δ PDCCH symbols after an end of the PDCCH triggering the aperiodic CSI-RS; and
      for $\mu_{PDCCH} > \mu_{CSIRS}$, the starting OFDM symbol is determined such that the CSI-RS reception starts no earlier than at least Δ PDCCH symbols after the end of the PDCCH triggering the aperiodic CSI-RS.

5. The UE of claim 4, wherein when $\mu_{PDCCH}$=0 indicating a subcarrier spacing of 15 kHz, Δ=4.

6. The UE of claim 1, wherein:
   the processor is further configured to determine a quasi co-location (QCL) assumption for the aperiodic CSI-RS reception based on a condition on a scheduling offset δ between a last symbol of the PDCCH triggering the aperiodic CSI-RS and a first symbol of the aperiodic CSI-RS, where the condition is given by,
      when δ<α, the QCL assumption is a QCL assumption for a PDSCH, if the PDSCH is received in the same OFDM symbols as the aperiodic CSI-RS, and the QCL assumption is a QCL assumption for a PDCCH, otherwise;
      when δ≥α, the QCL assumption is indicated via the PDCCH triggering the aperiodic CSI-RS; and the transceiver is further configured to apply the determined QCL assumption for the aperiodic CSI-RS reception, where α is a threshold and the QCL assumption corresponds to QCL-TypeD indicating a beam to receive the aperiodic CSI-RS.

7. The UE of claim 6, wherein the threshold $$\alpha = Y + d \frac{2^{\mu_{CSIRS}}}{2^{\mu_{PDCCH}}},$$

wherein Y is a UE reported threshold beamSwitchTiming taken from a set that includes {14, 28, 48}, and wherein d is an additional delay such that d=0 when $\mu_{PDCCH} \geq \mu_{CSIRS}$ and d=m when $\mu_{PDCCH} < \mu_{CSIRS}$.

8. The UE of claim 7, wherein:
when $\mu_{PDCCH}=0$ indicating a subcarrier spacing of 15 kHz, m=4;
when $\mu_{PDCCH}=1$ indicating a subcarrier spacing of 30 kHz, m=4; and
when $\mu_{PDCCH}=2$ indicating a subcarrier spacing of 60 kHz, m=8.

9. A base station (BS), the BS comprising:
a processor configured to generate an aperiodic channel state information reference signal (CSI-RS) configuration information and a downlink control information (DCI); and
a transceiver, operably connected to the processor, the transceiver configured to:
  transmit the aperiodic CSI-RS configuration information including a CSI-RS triggering offset;
  transmit the DCI via a physical downlink control channel (PDCCH), wherein the DCI triggers an aperiodic CSI-RS; and
  transmit the aperiodic CSI-RS in a slot $K_s$,
wherein the CSI-RS triggering offset is configured from a first set when $\mu_{PDCCH} < \mu_{CSIRS}$, and from a second set when $\mu_{PDCCH} \geq \mu_{CSIRS}$, where $\mu_{PDCCH}$ and $\mu_{CSIRS}$ are subcarrier spacing configurations for the PDCCH and the aperiodic CSI-RS, respectively, and
wherein the slot $K_s$ is determined based on the CSI-RS triggering offset, a slot containing the triggering DCI, and the subcarrier spacing configurations ($\mu_{PDCCH}$ and $\mu_{CSIRS}$).

10. The BS of claim 9, wherein the first set is {0, 1, 2, ... 31} and the second set is {0, 1, 2, 3, 4, 16, 24}.

11. The BS of claim 9, wherein the slot $$K_s = \left\lfloor n \cdot \frac{2^{\mu_{CSIRS}}}{2^{\mu_{PDCCH}}} \right\rfloor + X,$$

where n is the slot containing the triggering DCI, X is the CSI-RS triggering offset, and $\lfloor \cdot \rfloor$ is a floor function.

12. The BS of claim 9, wherein:
a starting orthogonal frequency-division multiplexing (OFDM) symbol for an aperiodic CSI-RS reception is determined based on the CSI-RS configuration information; and
the aperiodic CSI-RS reception is started from the starting OFDM symbol, where
for $\mu_{PDCCH} < \mu_{CSIRS}$, the starting OFDM symbol is determined such that the CSI-RS reception starts no earlier than a first OFDM symbol of a CSI-RS slot that starts at least Δ PDCCH symbols after an end of the PDCCH triggering the aperiodic CSI-RS; and for $\mu_{PDCCH} \geq \mu_{CSIRS}$, the starting OFDM symbol is determined such that the CSI-RS reception starts no earlier than at least Δ PDCCH symbols after the end of the PDCCH triggering the aperiodic CSI-RS.

13. The BS of claim 12, wherein when $\mu_{PDCCH}=0$ indicating a subcarrier spacing of 15 kHz, Δ=4.

14. The BS of claim 9, wherein:
a quasi co-location (QCL) assumption for aperiodic CSI-RS reception is determined based on a condition on a scheduling offset δ between a last symbol of the PDCCH triggering the aperiodic CSI-RS and a first symbol of the aperiodic CSI-RS, where the condition is given by,
  when δ<α, the QCL assumption is a QCL assumption for a PDSCH, if the PDSCH is received in the same OFDM symbols as the aperiodic CSI-RS, and the QCL assumption is a QCL assumption for a PDCCH, otherwise;
  when δ≥α, the QCL assumption is indicated via the PDCCH triggering the aperiodic CSI-RS; and
the determined QCL assumption for the aperiodic CSI-RS reception is applied,
where α is a threshold and the QCL assumption corresponds to QCL-TypeD indicating a beam to receive aperiodic CSI-RS.

15. The BS of claim 14, wherein the threshold $$\alpha = Y + d \frac{2^{\mu_{CSIRS}}}{2^{\mu_{PDCCH}}},$$

wherein Y is a UE reported threshold beamSwitchTiming taken from a set that includes {14, 28, 48}, and wherein d is an additional delay such that d=0 when $\mu_{PDCCH} \geq \mu_{CSIRS}$ and d=m when $\mu_{PDCCH} < \mu_{CSIRS}$.

16. The BS of claim 15, wherein:
when $\mu_{PDCCH}=0$ indicating a subcarrier spacing of 15 kHz, m=4;
when $\mu_{PDCCH}=1$ indicating a subcarrier spacing of 30 kHz, m=4; and
when $\mu_{PDCCH}=2$ indicating a subcarrier spacing of 60 kHz, m=8.

17. A method for operating a user equipment (UE) for aperiodic channel state information reference signal (CSI-RS) reception, the method comprising:
receiving aperiodic CSI-RS configuration information including a CSI-RS triggering offset;
receiving downlink control information (DCI) via a physical downlink control channel (PDCCH), wherein the DCI triggers the aperiodic CSI-RS; and
determining the CSI-RS triggering offset based on the CSI-RS configuration information, wherein:
  the CSI-RS triggering offset is configured from a first set when $\mu_{PDCCH} < \mu_{CSIRS}$, and
  the CSI-RS triggering offset is configured from a second set when $\mu_{PDCCH} \geq \mu_{CSIRS}$,
wherein $\mu_{PDCCH}$ and $\mu_{CSIRS}$ are subcarrier spacing configurations for the PDCCH and the aperiodic CSI-RS, respectively; and
receiving the aperiodic CSI-RS in a slot $K_s$ determined based on the CSI-RS triggering offset, a slot containing the triggering DCI, and the subcarrier spacing configurations ($\mu_{PDCCH}$ and $\mu_{CSIRS}$).

18. The method of claim 17, wherein:
the first set is {0, 1, 2, ... 31} and the second set is {0, 1, 2, 3, 4, 16, 24}; and
the slot $$K_s = \left\lfloor n \cdot \frac{2^{\mu_{CSIRS}}}{2^{\mu_{PDCCH}}} \right\rfloor + X,$$

where n is the slot containing the triggering DCI, X is the CSI-RS triggering offset, and $\lfloor \cdot \rfloor$ is a floor function.

19. The method of claim 17, further comprising:
determining a starting orthogonal frequency-division multiplexing (OFDM) symbol for the aperiodic CSI-RS reception; and
starting the aperiodic CSI-RS reception from the starting OFDM symbol, where
for $\mu_{PDCCH} < \mu_{CSIRS}$, the starting OFDM symbol is determined such that the CSI-RS reception starts no earlier than a first OFDM symbol of a CSI-RS slot that starts at least $\Delta$ PDCCH symbols after an end of the PDCCH triggering the aperiodic CSI-RS;
for $\mu_{PDCCH} \geq \mu_{CSIRS}$, the starting OFDM symbol is determined such that the CSI-RS reception starts no earlier than at least $\Delta$ PDCCH symbols after the end of the PDCCH triggering the aperiodic CSI-RS; and
when $\mu_{PDCCH}=0$ indicating a subcarrier spacing of 15 kHz, $\Delta=4$.

20. The method of claim 17, further comprising:
determining a quasi co-location (QCL) assumption for the aperiodic CSI-RS reception based on a condition on a scheduling offset $\delta$ between a last symbol of the PDCCH triggering the aperiodic CSI-RS and a first symbol of the aperiodic CSI-RS, where the condition is given by,
when $\delta<\alpha$, the QCL assumption is a QCL assumption for a PDSCH, if the PDSCH is received in the same OFDM symbols as the aperiodic CSI-RS, and the QCL assumption is a QCL assumption for a PDCCH, otherwise;
when $\delta \geq \alpha$, the QCL assumption is indicated via the PDCCH triggering the aperiodic CSI-RS; and
applying the determined QCL assumption for the aperiodic CSI-RS reception, wherein:
$\alpha$ is a threshold and the QCL assumption corresponds to QCL-TypeD indicating a beam to receive aperiodic CSI-RS,
the threshold $$\alpha = Y + d \frac{2^{\mu_{CSIRS}}}{2^{\mu_{PDCCH}}},$$

Y is a UE reported threshold beamSwitchTiming taken from a set that includes {14, 28, 48},
d is an additional delay such that d=0 when $\mu_{PDCCH} \geq \mu_{CSIRS}$ and d=m when $\mu_{PDCCH} < \mu_{CSIRS}$,
when $\mu_{PDCCH}=0$ indicating a subcarrier spacing of 15 kHz, m=4,
when $\mu_{PDCCH}=1$ indicating a subcarrier spacing of 30 kHz, m=4, and
when $\mu_{PDCCH}=2$ indicating a subcarrier spacing of 60 kHz, m=8.

* * * * *